United States Patent
Matos et al.

(10) Patent No.: US 7,840,317 B2
(45) Date of Patent: Nov. 23, 2010

(54) METHOD AND SYSTEM FOR CONTROLLING A HIJACKED AIRCRAFT

(76) Inventors: Jeffrey A. Matos, 132 Hillandale Dr., New Rochelle, NY (US) 10804; Karl F. Milde, Jr., 752 Union Valley Rd., Mahopac, NY (US) 10541

( * ) Notice: Subject to any disclaimer, the term of this patent is extended or adjusted under 35 U.S.C. 154(b) by 784 days.

(21) Appl. No.: 10/919,169

(22) Filed: Aug. 16, 2004

(65) Prior Publication Data
US 2006/0032978 A1 Feb. 16, 2006

(51) Int. Cl.
*G06F 19/00* (2006.01)
*G06F 17/00* (2006.01)

(52) U.S. Cl. .............. 701/16; 701/2; 701/11; 244/189

(58) Field of Classification Search ............ 701/16, 701/110, 2, 11, 4, 3, 9, 14, 36; 244/189, 244/190, 183, 175, 75.1, 46 R; 280/270; 340/541, 945, 540; 342/357.07, 357.09; 382/115; 380/258
See application file for complete search history.

(56) References Cited

U.S. PATENT DOCUMENTS

| | | | |
|---|---|---|---|
| 6,641,087 B1 | 11/2003 | Nelson | |
| 6,658,572 B1 | 12/2003 | Craig | |
| 6,747,577 B2 | 6/2004 | Chakravarty et al. | |
| 6,799,094 B1 * | 9/2004 | Vaida et al. | 701/3 |
| 6,965,816 B2 | 11/2005 | Walker | |
| 6,995,688 B2 * | 2/2006 | Reynolds | 340/945 |
| 7,131,136 B2 * | 10/2006 | Monroe | 725/105 |
| 7,142,971 B2 * | 11/2006 | Brown et al. | 701/110 |
| 7,184,863 B2 * | 2/2007 | Weineck | 701/2 |
| 7,225,063 B2 * | 5/2007 | Tart et al. | 701/4 |
| 2003/0055541 A1 * | 3/2003 | Haley | 701/11 |
| 2003/0062447 A1 * | 4/2003 | Cordina et al. | 244/118.5 |
| 2003/0093187 A1 * | 5/2003 | Walker | 701/1 |
| 2003/0200013 A1 | 10/2003 | Chakravarty et al. | |
| 2006/0285725 A1 * | 12/2006 | Recce | 382/115 |

FOREIGN PATENT DOCUMENTS

WO     WO 03/024795 A1 *   3/2003

* cited by examiner

*Primary Examiner*—Ronnie Mancho
(74) *Attorney, Agent, or Firm*—Karl F. Milde, Jr.; Eckert Seamans Cherin & Mellott, LLC

(57) ABSTRACT

A method and apparatus for controlling the flight of an aircraft in the event of an in-flight emergency is disclosed. The apparatus includes:
(a) a remote flight control, located separate and apart from said aircraft, for remote flight control of said aircraft by a remote human pilot;
(b) an onboard manual flight control on the aircraft for manual flight control of the aircraft by an onboard human pilot;
(c) an onboard autopilot on the aircraft for automatic flight control of the aircraft;
(d) a device for detecting an in-flight emergency on board the aircraft, when the onboard pilot is incapable of properly manually flying said first aircraft due to an attack upon the aircraft or its occupants, including its onboard human pilots, or due to any other incapacity of the onboard human pilots, and producing an in-flight emergency signal in response thereto; and
(e) an onboard remote piloting device on the aircraft for receiving the in-flight emergency control signal and control signals from said remote flight control device and allowing the control of the aircraft by the remote human pilot and preventing flight control by any person on board the aircraft.

85 Claims, 20 Drawing Sheets

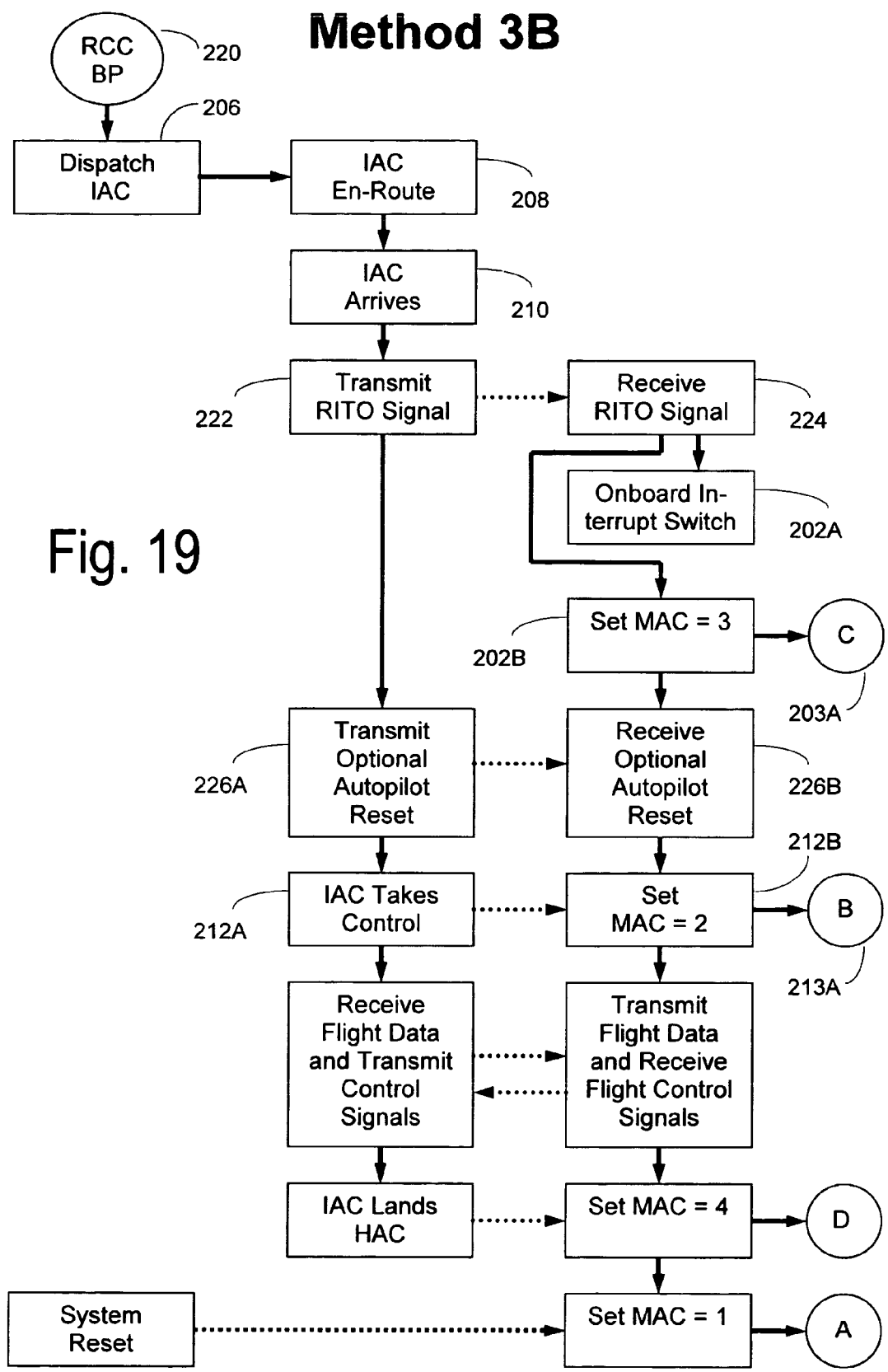

METHOD AND SYSTEM FOR CONTROLLING A HIJACKED AIRCRAFT

CROSS-REFERENCE TO RELATED APPLICATION

This application is related to, and claims priority from, U.S. patent application Ser. No. 10/328,589, filed Dec. 23, 2002, by Jeffrey A. Matos (now allowed) which application, in turn, claims priority from U.S. Provisional Application No. 60/342,439, filed Dec. 21, 2001, by Jeffrey A. Matos.

BACKGROUND OF THE INVENTION

The present invention relates to a method and apparatus for assuming and maintaining secure control of an aircraft in the event of an intended, attempted or actual attack upon, or incapacity of, the human pilot(s) of the aircraft. As is well known, terrorists and hijackers sometimes attempt to assume control of an aircraft by intimidating either the passengers and/or the crew. Once the attacker (terrorist or hijacker) takes control of an aircraft, he or she may cause it to fly to an inappropriate destination or may even cause the aircraft to crash.

The aforementioned U.S. patent application Ser. No. 10/328,589 discloses a system for assuming and maintaining secure remote control of an aircraft, in the event of an actual or potential aircraft hijacking, or incapacity of the pilot(s) due to illness or injury. The subject matter of that application (now allowed) is incorporated herein by reference.

A number of scenarios may arise, in the event of a hijacking or other incapacity of the pilot(s), which entail an early autopilot control phase, followed by a later remote pilot control phase. It is useful to consider such scenarios as separate and distinct methods of dealing with an in-flight emergency of the aircraft.

SUMMARY OF THE INVENTION

It is a principal object of the present invention to provide a method and apparatus for assuming and maintaining secure control of an aircraft in the event of an attack upon, or incapacity of, a pilot of the aircraft.

It is a further, more particular object of the present invention to provide a method and apparatus for properly controlling the flight of an aircraft in the event of a so-called "in-flight emergency", wherein the onboard human pilot(s) is/are incapable of properly manually flying the aircraft due to an attack upon the aircraft, its occupants, or its onboard human pilot(s); or due to any other incapacity of the onboard pilot(s).

It is a further, more particular object of the present invention to provide a method and apparatus for controlling the flight of an aircraft in the event of an in-flight emergency with the aid of "remote manual flight control means", located separate and apart from the aircraft. As used herein, the term "remote manual flight control means" refers to equipment remote from the aircraft, such as that disclosed in the aforementioned U.S. patent application Ser. No. 10/328,589, which enables manual flight control of the aircraft by a human pilot who is not on board the aircraft. A complete system for controlling the aircraft remotely must necessarily include not only the system elements at the remote location but also certain "remote piloting means" onboard the controlled aircraft which cooperates and communicates with the remote manual flight control means via a secure, two-way communication link.

It is a further, more particular object of the present invention to provide a method and apparatus for controlling the flight of an aircraft in the event of an in-flight emergency with the aid of remote manual flight control means, wherein, in addition to having onboard manual flight control means for manual flight control by an onboard human pilot, the aircraft has an onboard autopilot for automatic flight control of the aircraft.

It is a further, more particular object of the present invention to provide a method and apparatus for selecting among onboard flight control, remote flight control and autopilot control using a Master Aircraft Control, and a means for controlling the state selection of the Master Aircraft Control.

It is a further, more particular object of the present invention to provide the controlled aircraft following an in-flight emergency, with an early phase of autopilot control and a later phase of remote human pilot control.

It is a further, more particular object of the present invention to provide a method and apparatus for selecting among a plurality of landing destinations, which selection may be made automatically or by the remote pilot.

These objects, as well as other objects which will become apparent from the discussion which follows, are achieved, in accordance with the present invention, by a method comprising the following steps:

(a) detecting an in-flight emergency wherein the onboard pilot is incapable of properly manually flying the aircraft due to an attack upon the aircraft or its occupants, including its onboard human pilots, or any other incapacity of the onboard pilot(s);

(b) upon detection of the in-flight emergency, inactivating the onboard manual flight control means so that no onboard person is able to manually fly, or otherwise control, the aircraft;

(c) upon detection of the in-flight emergency, inactivating the response to onboard human control of the autopilot, so that no onboard person is able to affect the ability of the autopilot to automatically fly the aircraft in accordance with a prescribed emergency flight plan;

(d) upon detection of the in-flight emergency, initially controlling the flight of the aircraft by means of the onboard autopilot to cause the aircraft to fly in accordance with the prescribed emergency flight plan; and thereafter (e) manually flying the aircraft, with the aid of the remote manual flight control means controlled by the remote human pilot, to land the aircraft at an airfield.

In this method according to the invention, the term "prescribed emergency flight plan" is intended to mean a flight plan which is preprogrammed into the autopilot and is activated upon detection of the in-flight emergency. Alternatively, there may be a menu of possible flight plans, with either automatic or remote selection from among the menu choices.

As used herein, the term "in-flight emergency" is intended to include all situations which may require the measures according to the present invention These situations may include (a) an actual aircraft hijacking;
(b) a potential aircraft hijacking; and
(c) the occurrence, in-flight, of incapacity of one or more of the aircraft's pilots.

In the discussion which follows, the term "hijacked aircraft" or "HAC" is intended to refer to any aircraft which is subject to such an "in-flight emergency."

According to the invention, upon activating the emergency system, the controls of the autopilot system on the flight deck (cockpit) of the aircraft are deactivated so that the autopilot cannot deviate from its preprogrammed (menu of) prescribed emergency flight plan(s). Also according to the invention, upon activating the emergency system, the manual controls on the flight deck of the aircraft are deactivated to prevent any onboard human personnel from manually flying the aircraft or overriding the autopilot and deviating from the prescribed emergency flight plan. Again according to the invention, although the autopilot may control one or more intermediate phases of the flight, landing is controlled by the remote pilot. Only the remote human pilot may land the aircraft, by flying or otherwise controlling the aircraft, with the aid of (a) "remote manual flight control means" at a location remote from the controlled aircraft, and (b) cooperating "remote piloting means" onboard the aircraft.

According to a particular feature of the invention, the remote human pilot may modify the prescribed emergency flight plan or otherwise override the autopilot so that the aircraft is flown, either manually or automatically, in accordance with a new or modified prescribed emergency flight plan.

The present invention contemplates and accommodates three scenarios for assuming and maintaining secure control of an aircraft in the event of an in-flight emergency. In the event of such an emergency, a protective system is activated which does not permit any person on board the aircraft to control the flight of the aircraft. Initially, control of the aircraft is transferred to the autopilot (or maintained by the autopilot if the aircraft was previously under autopilot control). The autopilot flies the aircraft in accordance with the "prescribed emergency flight plan" which, in a preferred embodiment of the invention, includes whatever steps are necessary to fly the aircraft either part of the distance or all of the distance to the vicinity of an optimal airfield which has been designated, in advance, to receive aircraft under such emergency circumstances. Advantageously, the prescribed emergency flight plan causes the aircraft to be flown to the designated airfield at an altitude below 10,000 feet above sea level, terrain permitting, to minimize the effect of accidental sudden decompression of the aircraft cabin. Decompression may occur, for example, if terrorist weapons are discharged within the cabin, puncturing the cabin enclosure.

Also, according to the present invention, the aircraft is preferably flown to the vicinity of the designated airfield along a flight path which avoids over-flying populated areas on the ground. Such a flight path would minimize loss of life of ground personnel in the event that a suicide bomber, onboard the aircraft, were to cause a catastrophic explosion.

Also, according to the present invention, the aircraft is preferably flown to the vicinity of the designated airfield along a flight path which avoids (a) other aircraft and/or (b) specific areas of prime concern (e.g., government, military and industrial 'targets').

Preferably, the emergency flight plan is designed to select the closest, or otherwise most convenient one of a plurality of airfields which have been designated to receive aircraft under emergency circumstances. The choice of this airfield is made in dependence upon a number of factors such as the current location of the aircraft, the weather conditions, the requirement to fly over low populated areas and the like. The choice may also depend on the location of other aircraft, if any, which may simultaneously be experiencing emergency conditions. The identity of the selected airfield is preferably communicated by a secure telecommunication link to the remote pilot currently in charge of this flight. Alternatively, the remote pilot may select the designated airfield by transmitting a signal to the controlled aircraft which indicates either (a) the coordinates of the designated airfield, (b) the name of the designated airfield, or (c) the menu item number, selected from a numbered menu of possible designated airfields. In addition, the choice of designated airfield could be communicated to the air traffic controller in charge of the designated airfield.

After the aircraft has been flown by autopilot, control of the aircraft is transferred from the autopilot to a remote human pilot on an interceptor aircraft, referred to as the second aircraft. Transfer of control from the autopilot to the remote pilot aboard the second aircraft may occur (a) upon arrival of the second aircraft at a point which is substantially within line-of-sight range of the first aircraft, or (b) later in the flight. In the discussion which follows, the term "range of points which are substantially within line-of-sight" or "rLOS" is intended to refer to a range of distances between the respective antennae of the remote station (in the second aircraft or on the ground) and the controlled aircraft over which it is feasible to directly communicate without an intervening repeater unit. The term "vicinity," hereinabove and hereinbelow is intended to indicate a substantially larger range of distances than rLOS, encompassing, e.g., the outer range at which an aircraft begins to descend for a landing. In the case (a), the interceptor aircraft or "IAC"—in secure two-way communication with the controlled aircraft—may follow the controlled aircraft in flight so that the human pilot, on board the IAC, remains in a position behind or near the controlled aircraft in constant visual contact with the controlled aircraft. In the case (b), the IAC may fly within the rLOS of, but not take control of the first aircraft until late in the flight, to minimize the window in time during which communication hacking attempts could occur.

Preferably, the two-way communication link between the first and second aircraft is highly directional to prevent unauthorized communications with the first aircraft from a hacker, for example, from affecting the flight of the first aircraft. This direct, line-of-sight communication link thus becomes an "anti-hacking" feature which increases the security of the remote control flight system. Preferably, the transmitter on the second aircraft is of high output, and the receiver of the controlled aircraft is of low sensitivity. The receiver is thus capable of receiving only the high output directional signal transmitted from the second aircraft or ground-based remote control unit.

To further increase the security of the transmission link, the transmitted information is preferably encrypted as disclosed in the aforementioned U.S. patent application Ser. No. 10/328,589.

Alternatively, or in addition to the remote manual flight control system installed on the second aircraft, a remote human pilot may be located on the ground at a central station or at the designated landing airfield, in secure two-way communication with the first aircraft.

Other variations of the method according to the invention include:

A method in which control is returned to the onboard pilot, if certain conditions are met (e.g., the return-control signal originates from the interceptor aircraft within the rLOS of the HAC, and the interceptor can re-establish remote control if necessary. Returning control to the onboard human pilot may be desirable if there has been a false alarm, a system malfunction, or the like);

A method in which a remote pilot aboard an interceptor aircraft hands off control to other remote pilot(s) either (a) onboard other interceptor aircraft; (b) based on the ground, within the rLOS of the designated landing field; or (c) sequentially, (a) followed by (b);

A method in which a remote pilot takes control of the hijacked aircraft immediately, and in which autopilot control occurs only in the event of communications failure between the remote pilot and hijacked aircraft; and A method in which a remote-initiated protective system activation is not possible.

For a full understanding of the present invention, reference should now be made to the following detailed description of the preferred embodiments of the invention as illustrated in the accompanying drawings.

BRIEF DESCRIPTION OF THE DRAWINGS

FIG. 19 is a representational block diagram illustrating another method of state selection for the Master Aircraft Control.

DETAILED DESCRIPTION OF THE PREFERRED EMBODIMENTS

Contents

Figure 1:
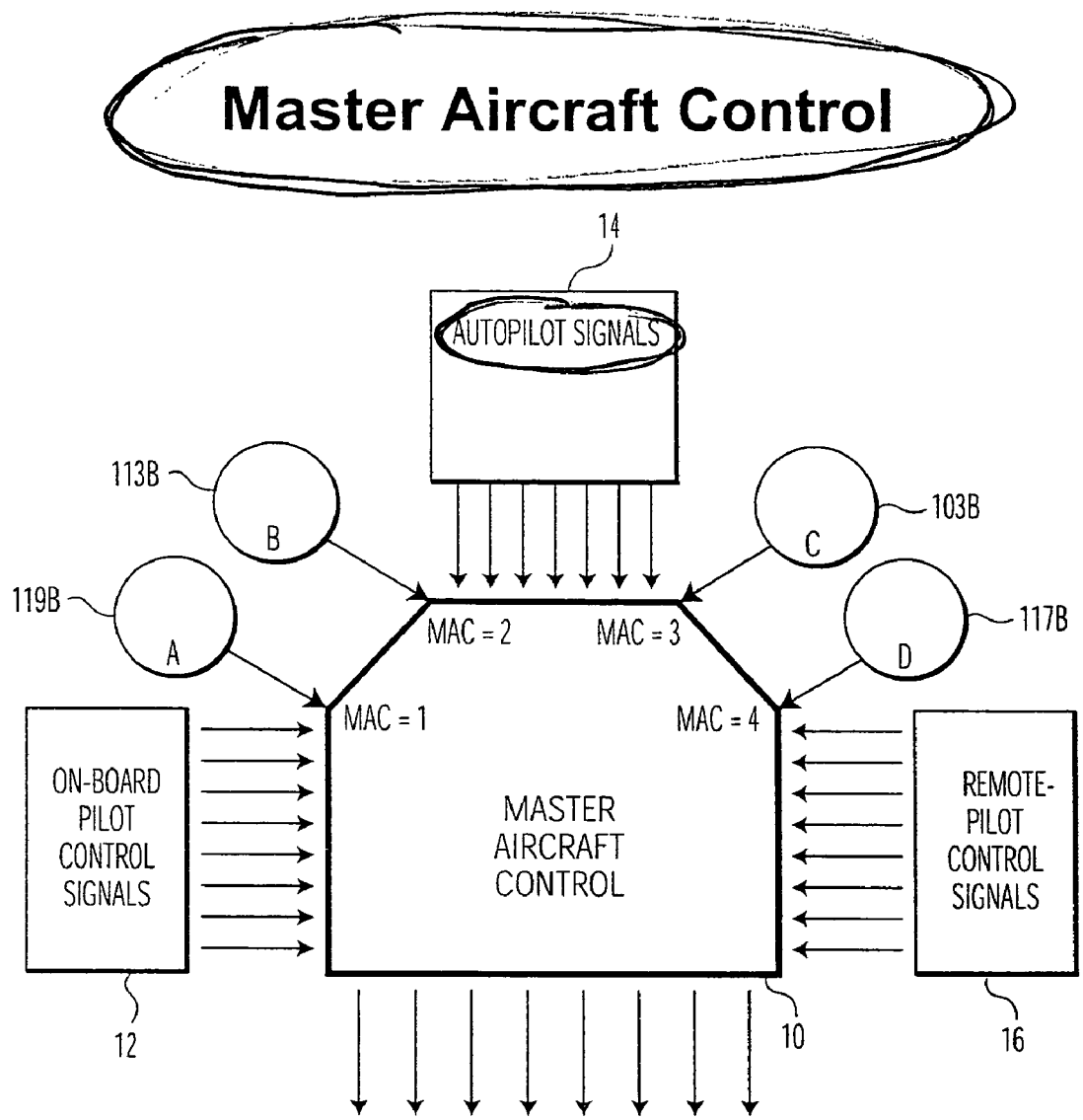
FIG. 1 is a block diagram showing a Master Aircraft Control unit, which operates to control the flight of an aircraft.

1. Overview
2. System Elements and Basic Operational Features
   2.1 Master Aircraft Control
      2.1.1 MAC States
      2.1.2 MAC State Transitions
         2.1.2.1 Transitions from MAC State 1
         2.1.2.2 Transitions from MAC State 2
         2.1.2.3 Transitions from MAC State 3
         2.1.2.4 Transitions from MAC State 4
      2.1.3 Other Embodiments of Aircraft Control
   2.2 Pilot Initiated Takeover Unit
      2.2.1 Pilot Initiated Takeover Unit Hardware
      2.2.2 Pilot Initiated Takeover Unit Outputs
      2.2.3 Pilot Initiated Takeover Unit: System Operation
      2.2.4 Takeover Nomenclature
   2.3 Methods of Remote Control Initiation
      2.3.1 PITO
      2.3.2 Distant RITO
         2.3.2.1 Distant RITO of Terrestrial Origin
         2.3.2.2 Distant RITO of Airborne Origin
      2.3.3 Local RITO
   2.4 Methods of Remote Control Maintenance
      2.4.1 Flight Phase Nomenclature
      2.4.2 Autopilot During Phase III
      2.4.3 Distant Pilot During Phase III
         2.4.3.1 Ground Based Distant Pilot
         2.4.3.2 Air Based Distant Pilot
      2.4.4 Local Pilot During Phase III
         2.4.4.1 Air Based Local Pilot
         2.4.4.2 Ground Based Local Pilot
   2.5 Options for Control During Phase IIIB
   2.6 Options for Landing
3. Details of Aircraft Control Methods
   3.1 Nomenclature
   3.2 Methods with Intermediate Autopilot Control
      3.2.1 Method 1B, PITO
      3.2.2 Method 2B, Distant RITO
      3.2.3 Method 3B, Local RITO
   3.3 Methods without Intermediate Autopilot Control
      3.3.1 Method 1A, PITO
      3.3.2 Method 2A, Distant RITO
      3.3.3 Method 3A, Local RITO
   3.4 Total Number of Combinations, Non-Complex Methods
4. Complex Methods: Additional Handoffs During Phases III and IV
   4.1 IAC-1 pilot to IAC-2 pilot
   4.2 Local Ground Pilot-1 to Local Ground Pilot-2
   4.3 Local Ground Pilot to IAC-based Pilot
   4.4 Distant Ground Pilot-1 to Distant Ground Pilot-2
   4.5 IAC-based Pilot to Distant Ground Pilot 4.6 Example of Complex, Highly Secure Combination of HAC Control Options
5. Flight Control Apparatus
  5.1 Apparatus on the Controlled Aircraft
  5.2 Apparatus at the Remote Flight Control Center
6. Flow Diagrams: Methods with Intermediate Autopilot Control
  6.1 Methods 1B and 2B
    6.1.1 Method 1B
    6.1.2 Method 2B
  6.2 Method 3B 1. Overview The preferred embodiments of the present invention will now be described with reference to FIGS. 1-19 of the drawings. Identical elements in the various figures are designated with the same reference numerals.

Figure 16:
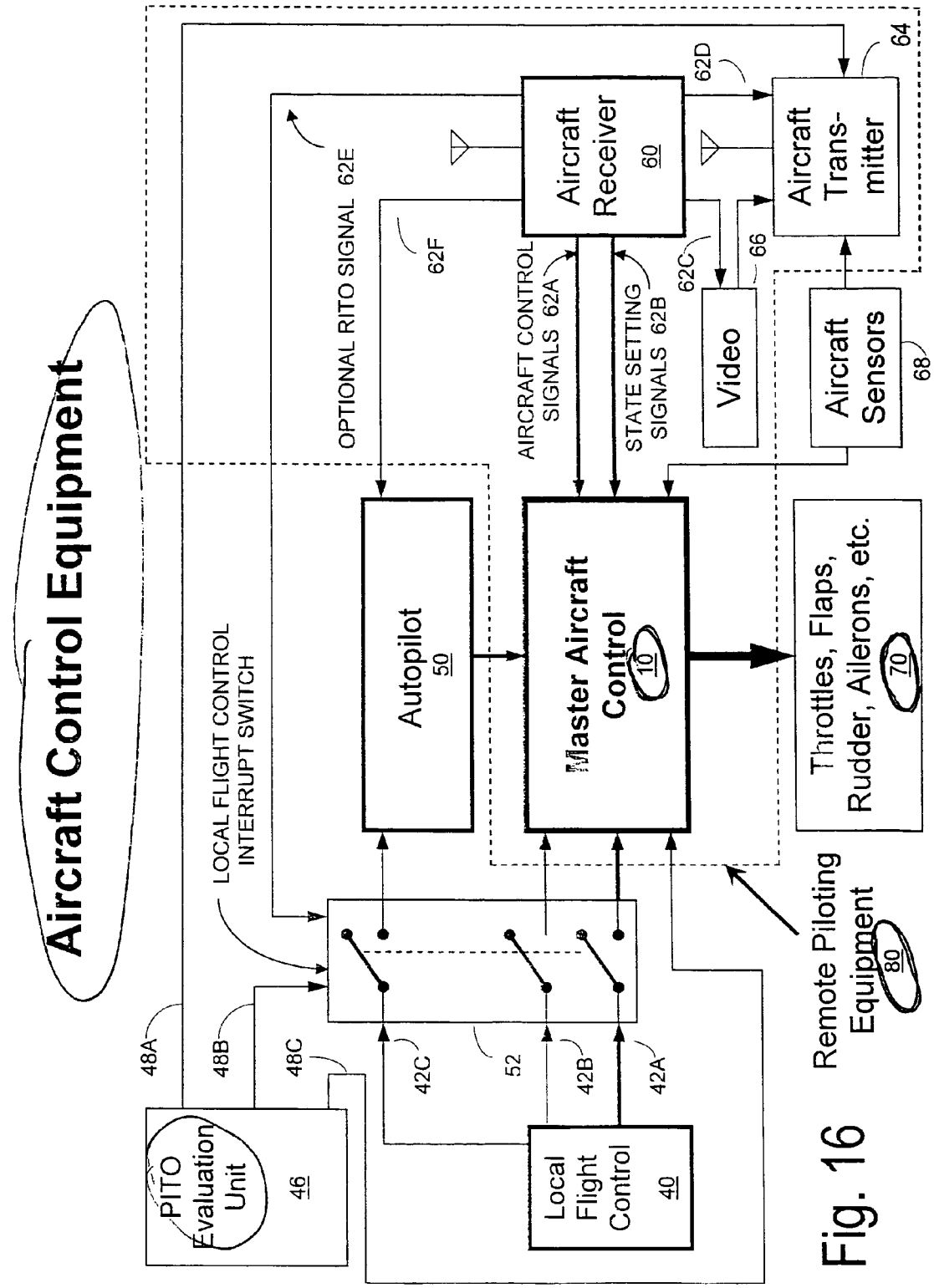
FIG. 16 is a block diagrams of apparatus, onboard an aircraft, which can be controlled to operate in accordance with the method of the present invention.
Figure 17:
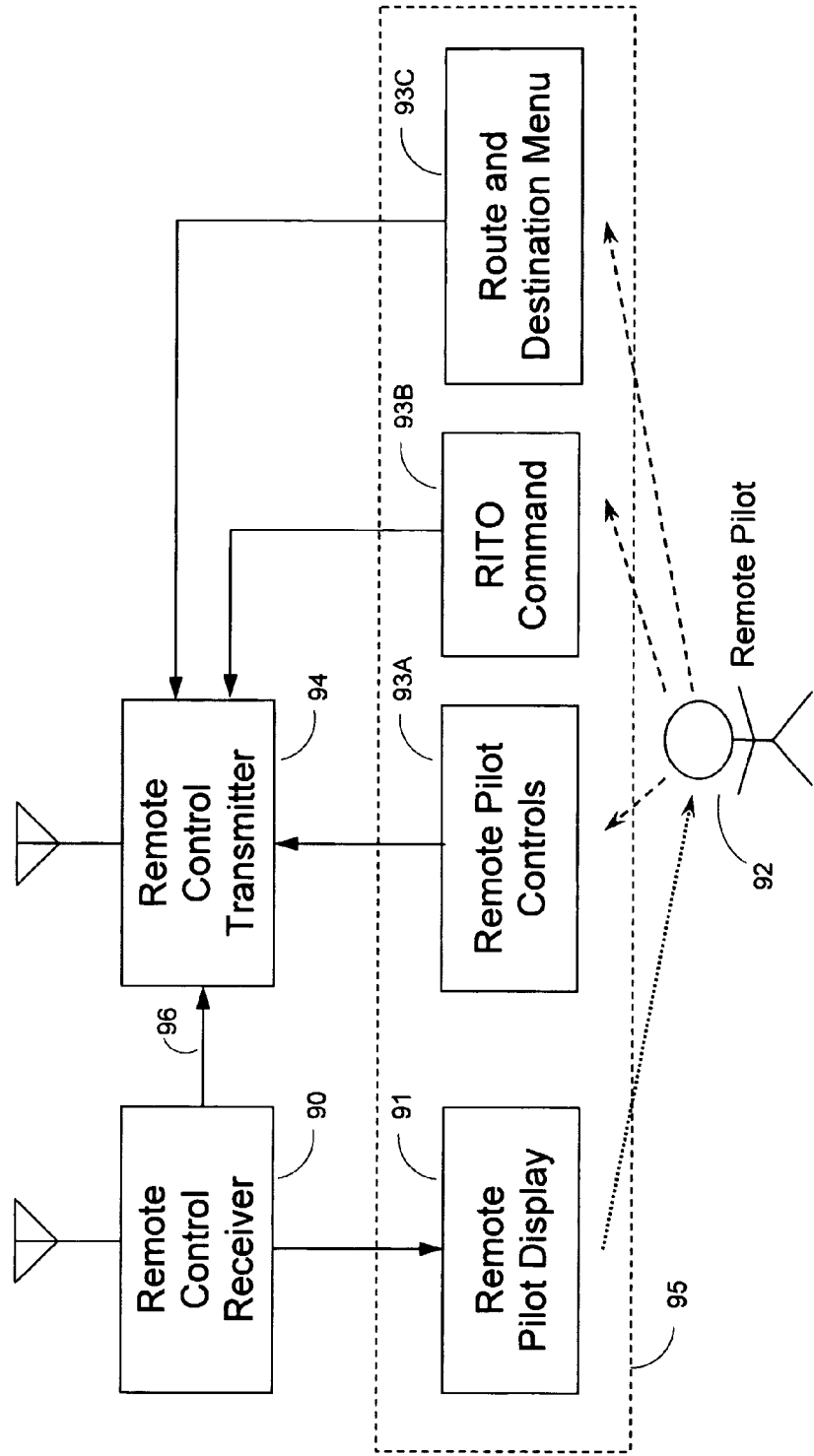
FIG. 17 is a block diagram of apparatus, at the remote control center, which co-operates with the apparatus of FIG. 16 to operate in accordance with the method of the present invention.
Figure 18:
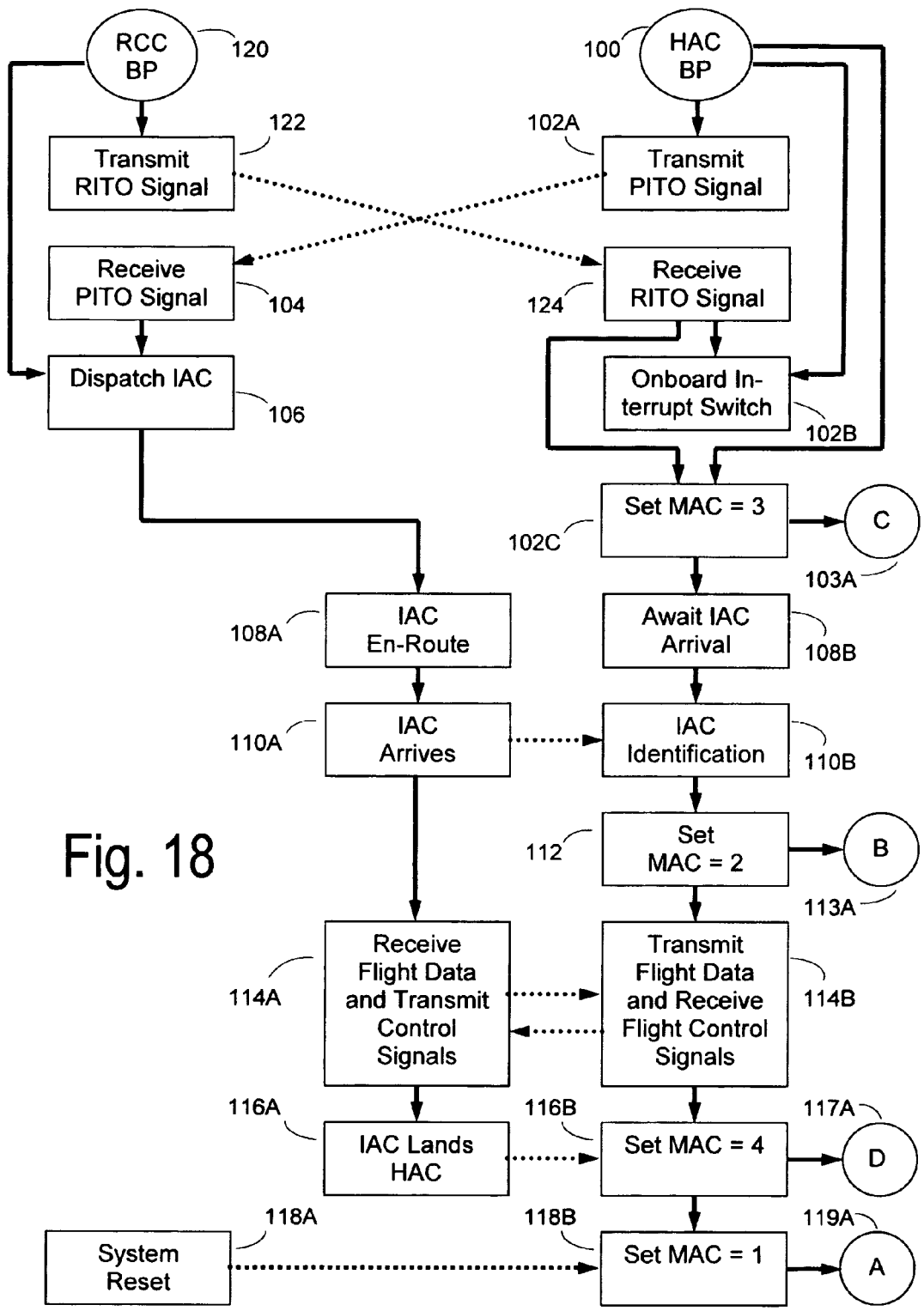
FIG. 18 is a representational block diagram illustrating two methods of state selection for the Master Aircraft Control.

FIGS. 1-8 are selected and modified drawings from applicant's aforementioned U.S. patent application Ser. No. 10/328,589 which illustrate certain basic principles of operation of the present invention. FIG. 9 illustrates a method of remote controlled landing by a ground-based local pilot. FIGS. 10-15 illustrate six different methods for declaring an in-flight emergency and controlling the flight of an aircraft subject to such an emergency. FIGS. 16 and 17 illustrate the apparatus required, onboard the aircraft and at a remote location, respectively, to practice the method according to the present invention. FIGS. 18 and 19 illustrate the sequence of MAC State transitions during system operation.

2. System Elements and Basic Operational Features 2.1 Master Aircraft Control

FIG. 1 shows a Master Aircraft Control 10, disposed onboard an aircraft, which operates to select one of three possible sources of control signals that will control the aerodynamic surfaces and other parameters of the aircraft. In particular, the Master Aircraft Control receives (1) signals 12 from the onboard manual flight control equipment, which is responsive to the onboard pilot, (2) signals 14 from the autopilot, and (3) signals 16 from remote flight control equipment, which is operated by a remote human pilot located either in another aircraft or on the "ground" (i.e., either physically on land or at sea). The Master Aircraft Control 10 selects one of these three sources of control signals and passes these signals to the various control devices of the aircraft to actuate the throttles, elevator, rudder, flaps, ailerons, landing gear and all other components which must be controlled during flight.

2.1.1 MAC States

The Master Aircraft Control 10 may assume one of four control states—MAC State 1, MAC State 2, MAC State 3 or MAC State 4—in response to respective state control signals received from a microprocessor, as fully described in the aforementioned U.S. patent application Ser. No. 10/328,589. Table 1, below, summarizes the four possible states of the Master Aircraft

TABLE 1

Master Aircraft Control States

| Master Aircraft Control State | Aircraft Status: |
|---|---|
| 1 | Aircraft controlled by onboard pilot |
| 2 | Aircraft controlled by remote pilot |
| 3 | Aircraft controlled by autopilot |
| 4 | Post Landing: additional restrictions |

In MAC State 1, the onboard pilot control signals 12 produced by the onboard manual flight control equipment in response to actuations by the pilot are passed through the Master Aircraft Control 10 to control the flight of the aircraft. In MAC State 2, remote control signals 16 received from remote manual flight control equipment are passed through the Master Aircraft Control 10 to control the flight of the aircraft. In MAC State 3, signals 14 received from the autopilot are passed through the Master Aircraft Control 10 to control the flight of the aircraft.

If the Master Aircraft Control 10 is placed in MAC State 4, either (a) no signals are passed through, or (b) a limited set of signals—which would allow only a highly restricted set of aircraft operations—is passed through. This state is selected upon landing the aircraft after an in-flight emergency has occurred to prevent the aircraft from taking off again before the emergency condition has been investigated and resolved. For example, in this state the aircraft engine controls may be inhibited to prevent the engines from being accelerated to take-off power.

Besides the three sets of aircraft system control signals 12, 14 and 16 which input the MAC 10, there are four state-setting inputs 119B, 113B, 103B and 117B to the MAC:

(a) An input signal at 119B causes MAC 10 to enter MAC State 1.

(b) An input signal at 113B causes MAC 10 to enter MAC State 2.

(c) An input signal at 103B causes MAC 10 to enter MAC State 3.

(d) An input signal at 117B causes MAC 10 to enter MAC State 4.

The source of the aforementioned four input signals is discussed below in connection with FIGS. 18 and 19.

2.1.2 MAC State Transitions

The subject of the present invention is aircraft protection which entails a sequence of MAC state transitions from State 1 to State 3 to State 2 to State 4.

The allowable transitions between MAC states are summarized below in Table 2:

TABLE 2

Allowed Transitions Between MAC States Associated with Remote Controlled Flight

| From MAC State: | To MAC State: | Transition Initiated By: |
|---|---|---|
| 1 | 2 | PITO or RITO |
| 1 | 3 | PITO or RITO |
| 3 | 2 | Remote Pilot - following a State 1 to State 3 transition |
| 2 | 3 | Communications Failure during Remote Controlled Flight |
| 3 | 2 | Communications Restoration following a State 2 to State 3 transition |
| 2 | 1 | Failure of Both Communications and Autopilot |
| 3 | 1 | Failure of Both Communications and Autopilot |
| Any | 4 | Aircraft Landing |
| 4 | 1 | Loading of New Encryption Codes |

2.1.2.1 Transitions from MAC State 1

Scenarios in which control is transferred from the onboard pilot directly to the remote pilot, i.e., MAC State 1 to MAC State 2 are the subject of the aforementioned U.S. patent application Ser. No. 10/328,589. The three scenarios are discussed below in connection with FIGS. 13-15, and referred to as Methods 1A, 2A and 3A.

Scenarios in which control is first transferred from onboard pilot to autopilot, i.e., MAC State 1 to MAC State 3, and later to the remote pilot, i.e., MAC State 3 to MAC State 2, are the basis of the present invention. They are discussed below in connection with FIGS. 10-12 and 18-19, and referred to as Methods 1B, 2B and 3B.

2.1.2.2 Transitions from MAC State 2

As indicated in Table 2, a transition from MAC State 2 to MAC State 3 may occur if a communications interruption occurs while the remote pilot is flying the controlled aircraft. Following the restoration of communications, a transition back to MAC State 3 may occur.

Other situations in which a transition from MAC State 2 to MAC State 3 could occur would be:

(a) by command of the remote pilot, if the remote pilot concludes that such a transition is best, at that time, for reasons which may include:
  (i) frequent communication interruptions, or
  (ii) the remote pilot becomes aware of attempted hacking, or
  (iii) the remote pilot becomes aware of an equipment malfunction involving either the remote piloting means, the remote flight control means, or any of system upon which these two are dependent.

(b) as a result of a system feature aboard the controlled aircraft in which, in the event of repeated communications interruptions whose pattern of interruption satisfies certain criteria, a transition from MAC State 2 to MAC State 3 will occur automatically. (This is discussed in the aforementioned U.S. patent application Ser. No. 10/328,589, in which it is referred to as the 'anti-hunting algorithm.')

A transition from MAC State 2 to MAC State 4 occurs when the aircraft lands.

Embodiments of the invention are possible in which a transition from MAC State 2 to MAC State 1 may be:

(a) forbidden. This is the method of the preferred embodiment of the invention. The advantage of forbidding this transition is a security measure; i.e., no means of coercion on the part of a hijacker would result in return of control to the HAC (hijacked aircraft); and knowledge that the system functions in this manner would make it known to a potential or actual hijacker that a return to MAC State 1 after PITO or RITO is impossible; or (b) possible, in the event that certain conditions are fulfilled. These could include:
  (i) failure of both the autopilot and the communications with the remote pilot;
  (ii) evidence that PITO or RITO was a 'false alarm' because of either misinformation or equipment failure; or
  (iii) at the discretion of an authorized person not on the controlled aircraft.

2.1.2.3 Transitions from MAC State 3

Three methods of aircraft control (see Sections 3.2.1, 3.2.2 and 3.2.3) involve aircraft protection by the sequence of MAC state transitions from State 1 to State 3 to State 2.

The transition from MAC State 3 to MAC State 2 occurs at some point in time before the HAC lands. Since landing is performed by the remote pilot, it is not anticipated that a transition from MAC State 3 to MAC State 4 would occur. An exception would be a communications interruption occurring during the last moments preceding aircraft touchdown, resulting in a transition from MAC State 2 to MAC State 3 just prior to touchdown (and MAC State 4 immediately after touchdown).

The circumstances under which a transition from MAC State 3 to MAC State 1 would be allowed include:

(a) parallel circumstances to those discussed above in Section 2.1.2.2, with regard to transition from MAC State 2 to MAC State 1, and (b) during a normal flight in which the autopilot is used as part of routine operations.

2.1.2.4 Transitions from MAC State 4

Upon the landing of the controlled aircraft, MAC 10 enters MAC State 4, no matter which state MAC was in prior to the landing.

Once in MAC State 4, the only transition possible is to MAC State 1, and this occurs only if and when the system has been properly reset.

2.1.3 Other Embodiments of Aircraft Control

Embodiments of the invention are possible, which do not contain a discrete unit which performs the functions of the Master Aircraft Control. For example, one such embodiment would include a plurality of Local Aircraft Control units. Each of these local units would: (a) control the function of single element, e.g., the flaps, and (b) would have four possible states, analogous to the those of the Master Aircraft Control.

Embodiments of the invention are possible in which control—whether Master or Local—is selected not as a single choice from among four possibilities, but as a series of decisions, each of which entails a smaller number of choices—e.g., two. For example:

(a) a takeover command (see below) operates each of two switching circuits:
  (i) one of which removes control from the on-board pilot, and
  (ii) one of which gives control to the autopilot.

(b) The arrival of and proper identification of a remote pilot aboard an interceptor aircraft operates each of two switching circuits:
  (i) one of which removes control from the autopilot (which may be the same switch as mentioned in (a)(ii) above, or a different one, and
  (ii) one of which gives control to the remote pilot.

(c) landing results in the operation of switching circuits which affect engine throttle control.

These switching circuits could operate in a manner analogous to master control, or in a manner analogous to local control, as discussed above.

Finally, embodiments of the invention are possible in which there are more or less than four possible operational states. One such example is a system without a MAC State 4, in which the remote pilot remains in full control of all aircraft functions post landing. Examples of additional states (beyond four) include specific states for certain critical functions, e.g., landing, or loading of encryption or identification codes.

2.2 Pilot Initiated Takeover Unit 2.2.1 Pilot Initiated Takeover Unit Hardware

Figure 2:
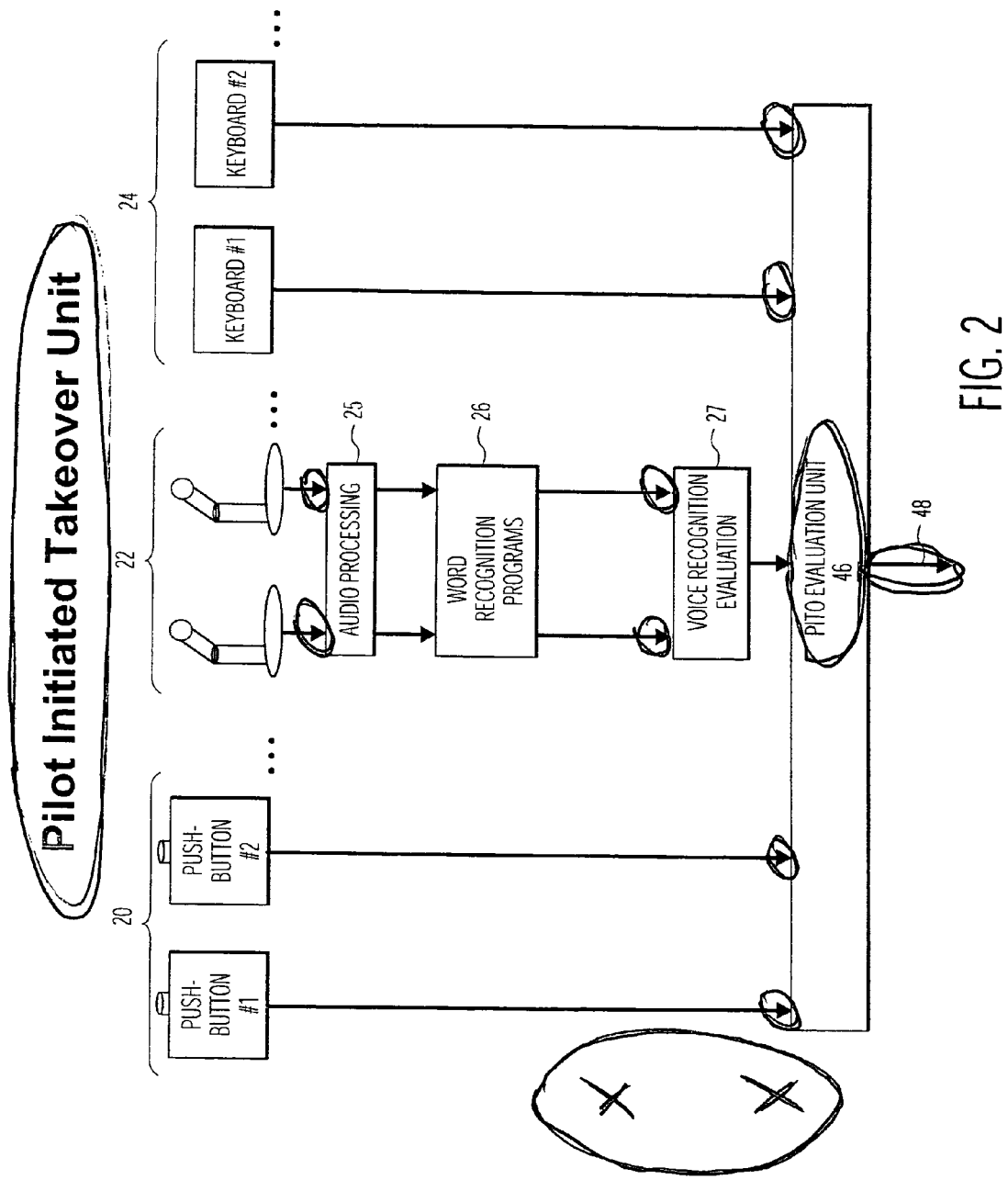
FIG. 2 is a block diagram of an onboard system for reporting the existence of an in-flight emergency on an aircraft.

FIG. 2 illustrates a system, for use onboard an aircraft, for detecting and declaring an in-flight emergency on the aircraft. This system comprises, as inputs, a plurality of push buttons 20, a plurality of microphones 22 and a plurality of keyboards 24, all of which are arranged at strategic locations within and throughout the aircraft cabin. The system may include other inputs, such as an ID card input, video input or the like.

Signals from the microphones 22 are passed through audio processing 25 to a word recognition system 26. They may be passed through a system 27 which has the capability of distinguishing a particular individual's voice. The outputs from all the input sources are collected in the PITO evaluation unit 46 which determines whether or not an in-flight emergency should be declared. One or more microprocessors—each of which may be one of many types known in the art—perform word and/or voice recognition and the functions of the evaluation unit, using techniques which are known in the art.

2.2.2. Pilot Initiated Takeover Output Units

Upon the declaration of in-flight emergency, three signals 48 are sent from the PITO evaluation unit (see FIG. 16):

(a) to the Master Aircraft Control 10, which switches from MAC State 1 to MAC State 3 (in Methods 1B, 2B and 3B, see below) or to MAC State 2 (in Methods 1A, 2A and 3A, see below), taking control away from the onboard pilot or any other personnel onboard the aircraft.

(b) to an interrupt switch 52 (see Section 5.1 below) which disconnects onboard pilot signals from the MAC and from the autopilot.

(c) a signal is transmitted to the remote control center to alert them to the in-flight emergency (see below).

2.2.3 Pilot Initiated Takeover Unit: System Operation

The system of FIG. 2 may be programmed in various ways to detect an in-flight emergency. Clearly, an authorized member of the aircraft crew may press a nearby "panic button" if they see that an in-flight emergency is in progress. Passenger inputs would be possible; they would have a different status than those of the aircraft crew. Alternatively, a push button 20 in the aircraft flight deck may be required to be pressed at certain specified times or intervals to avoid the declaration of an in-flight emergency.

Similarly, the pilot(s) or a member of the crew may type one or more authorization codes into one or more keyboards 24 to declare an in-flight emergency. Alternatively, a pilot or crew member may be required to type in an authorization code at specified times or intervals to avoid the declaration of an in-flight emergency.

Similarly, spoken words may be used to either trigger or prevent the declaration of an in-flight emergency.

An additional possible input to the PITO unit, is an indication by the Global Positioning System that the aircraft has deviated significantly from the originally intended course or has deviated into the vicinity of a no-fly zone.

Other circumstances, which could give rise to the detection, onboard an aircraft, of an in-flight emergency, will occur to those skilled in the art.

PITO evaluation unit 46 processes pushbutton, keyboard, voice and any other inputs. Most systems with more than one input, or with a single input whose value is other than binary (i.e., other than the equivalent of a single pole single throw switch) or whose input requires specific timing will need a means by which an input evaluation is performed. Such means will assess how close the input(s) come to predetermined expectations. A quantization of the actual result will be the determinant of whether an in-flight emergency is declared. In one embodiment of the invention, PITO unit inputs which are not sufficient to result in the declaration of an in-flight emergency result in a transmission of signals to the remote control center. These signals may include the unprocessed inputs to the PITO unit, or a processed version of these inputs, such as the output of the PITO evaluation unit 46.

2.2.4 Takeover Nomenclature

Since the in-flight emergency signal necessarily leads to the "takeover" of the aircraft from the pilot(s) onboard the aircraft, the term "in-flight emergency signal" will hereinafter be denominated with the more convenient term "takeover" signal or, simply, "TO" signal. This takeover signal may be initiated by the pilot or crew on the aircraft, resulting in a "pilot initiated takeover" signal or "PITO" signal, or it may originate from ground personnel such as an air traffic controller or personnel at a terrestrial remote control center (TRCC) set up and designed to detect, monitor and control such in-flight emergencies; or from an airborne remote control center (ARCC) perhaps aboard an interceptor aircraft, sent aloft to investigate a possible in-flight emergency. In these cases, the takeover signal will be denominated a "remote initiated takeover" or "RITO" signal.

Distances between two communicating or potentially communicating entities which are less than rLOS, are referred to as "local" and distances greater than rLOS are referred to as "distant."

2.3 Methods of Remote Control Initiation 2.3.1 PITO

Figure 3:
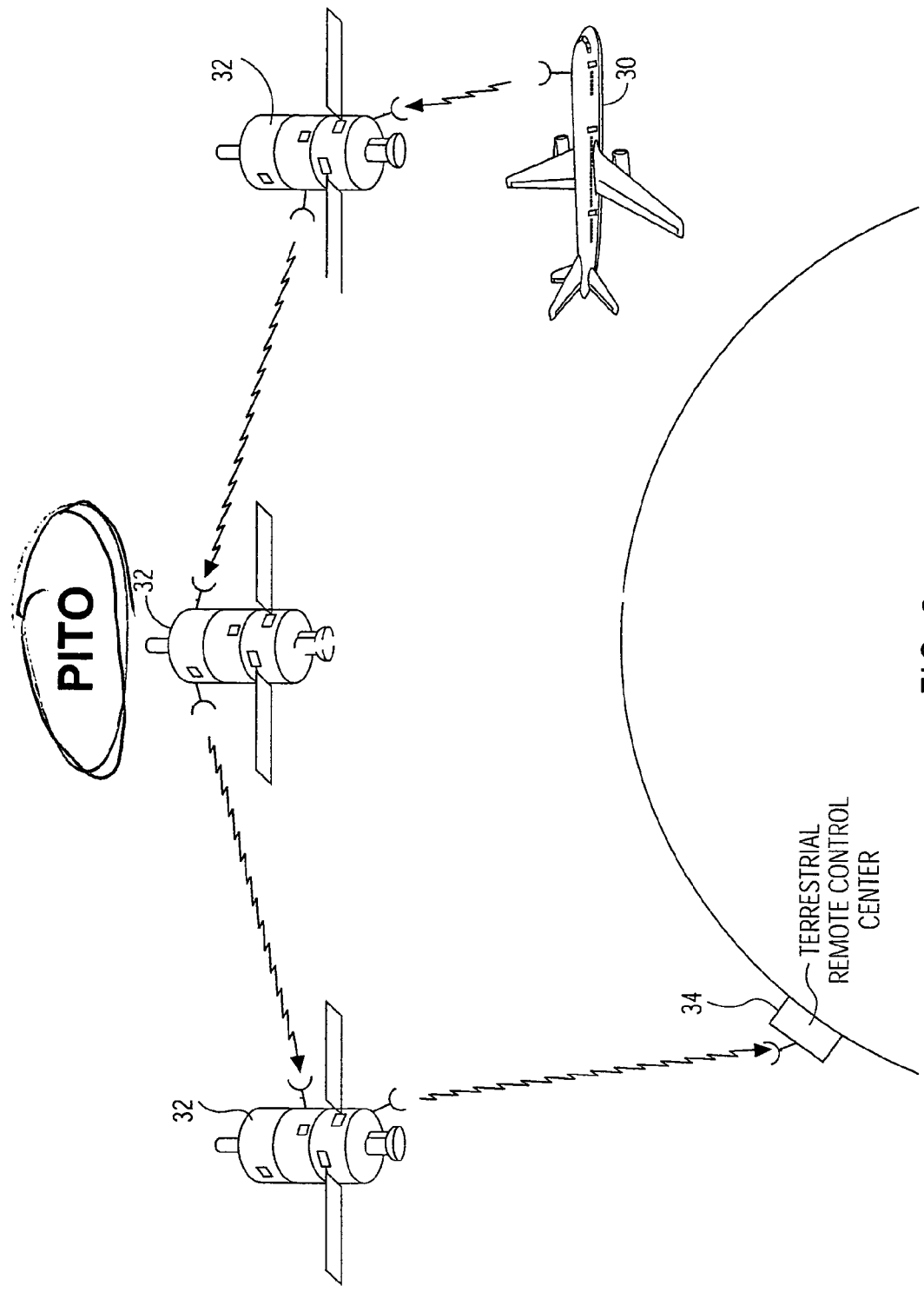
FIG. 3 is a representational diagram illustrating how a pilot initiated takeover signal may be relayed from an aircraft to a terrestrial remote control center, following detection of an in-flight emergency on the aircraft.

FIG. 3 illustrates how an in-flight emergency signal, originating on aircraft 30—that is, a PITO signal—may be transmitted to a terrestrial remote control center 34. Advantageously, such a signal may be relayed upward from the aircraft 30 to one or more communication satellites 32, which relay the signal to the remote control center.

Two approaches to PITO, referred to as "Method 1A" and "Method 1B", are discussed below in Section 3. Method 1A, discussed below and in U.S. patent application Ser. No. 10/323,589 entails a direct transition from MAC State 1 to MAC State 2. Method 1B entails a transition from MAC State 1 to MAC State 3, and later to MAC State 2.

2.3.2 Distant RITO

A RITO command may distant, originating from a location outside of the rLOS from the HAC or local, originating within the rLOS. Allowing distant RITO scenarios makes the distance over which hacking may be attempted larger, thereby increasing the chance of such an occurrence. On the other hand, distant RITO may be brought into effect very quickly, i.e., without the delay implicit in scrambling an interceptor aircraft from which local RITO may occur. Local RITO, has the advantage of utilizing far more restrictive communication means, but the disadvantage of delay until its execution.

Two approaches to distant RITO, referred to as "Method 2A" and "Method 2B", are discussed below in Section 3. Method 2A, discussed below and in U.S. patent application Ser. No. 10/328,589 entails a direct transition from MAC State 1 to MAC State 2. Method 2B entails a transition from MAC State 1 to MAC State 3, and later to MAC State 2.

2.3.2.1 Distant RITO of Terrestrial Origin

Figure 4A:
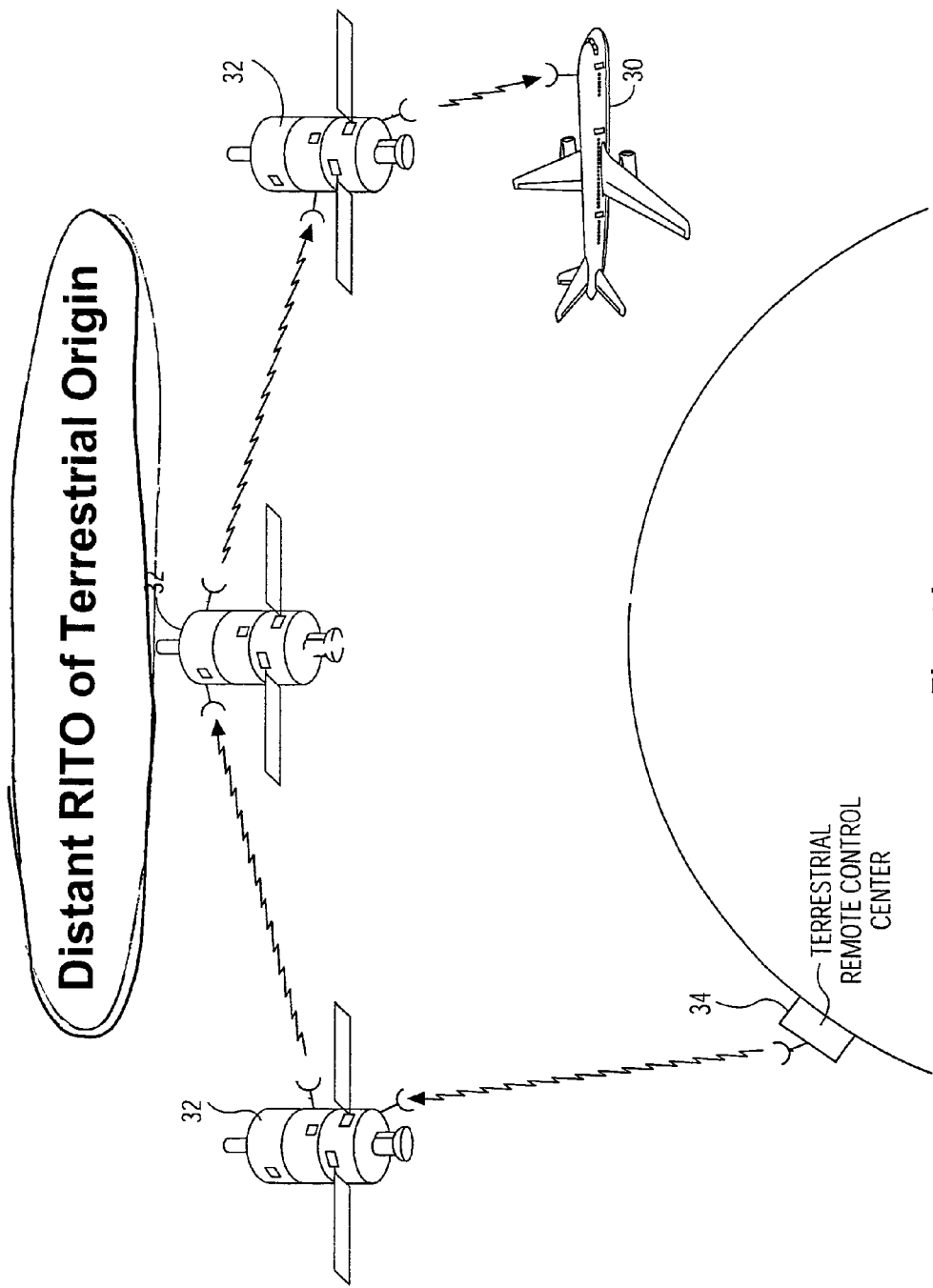
FIG. 4A is a representational diagram showing how a distant remote initiated takeover signal may be relayed to an aircraft to be controlled from a terrestrial remote control center, following the declaration of an in-flight emergency.

As shown in FIG. 4A, the in-flight emergency may be detected and declared from a terrestrial remote control center (TRCC). If a designated TRCC person or persons become aware that an aircraft is or may be subject to a possible or actual hijacking or terrorist action, they may initiate a RITO Command. Such awareness may be based on:

(a) inappropriate action of the pilot or of the aircraft;

(b) unauthorized and/or inappropriate deviation of the aircraft from a previously-filed flight plan;

(c) a pilot not properly responding to requests (either terrestrial or air-based) to alter his flight plan;

(d) the aircraft over-flying a restricted airspace;

(e) the monitoring of audio from on-board aircraft indicating that the pilot is not able to properly control the aircraft;

(f) the monitoring of video from on-board aircraft indicating that the pilot is not able to properly control the aircraft;

(g) direct visual observation of aircraft by persons aboard a nearby aircraft;

(h) the request of the pilot of the aircraft, or of any designated person or persons aboard the aircraft;

(i) one or more inputs to the PITO unit that were issued in a manner that do not properly meet the pre-established PITO technique, code, word(s) or action(s);

(j) information from other sources of information (e.g., military information, news media, or individual persons other than the pilot and designated aircraft crew) that aircraft is the subject of a hijacking or terrorist action; and/or (k) combinations of two or more of (a) through (j), immediately above.

In one embodiment of the invention, any PITO command would have to be followed by a confirmatory action by a person in the TRCC or ARCC in order to cause MAC 10 to go from MAC State 1 to MAC State 2 or MAC State 3. In this case, the decision of a TRCC or ARCC person to take control could be based on:

(a) the PITO itself (e.g., whether it was initiated in exactly or nearly exactly the proper manner);

(b) any one or more of the RITO criteria (a) through (j), above; or (c) a combination of PITO and RITO criteria.

2.3.2.2 Distant RITO of Airborne Origin

Figure 4B:
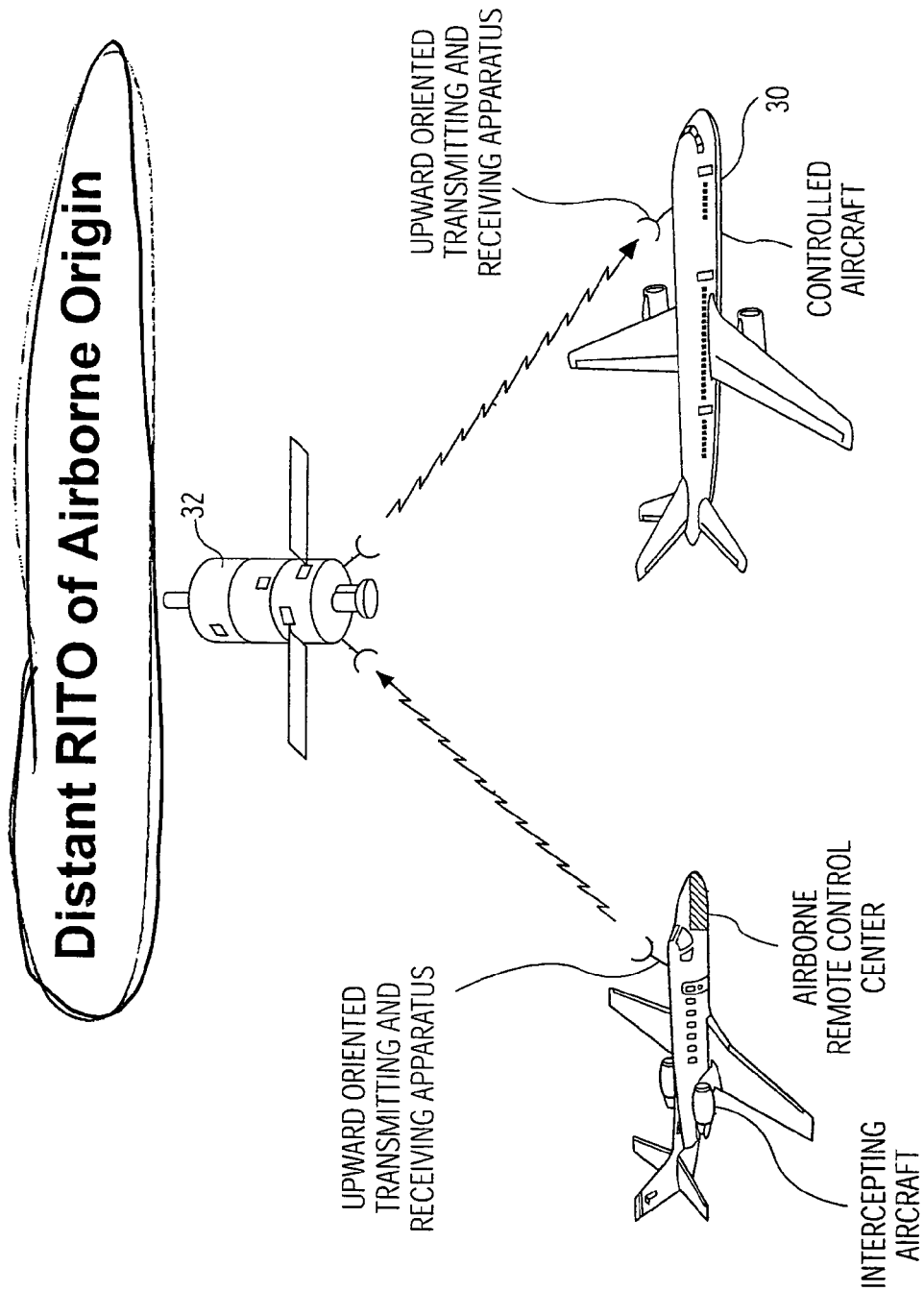
FIG. 4B is a representational diagram showing how a distant remote initiated takeover signal may be relayed to an aircraft to be controlled from an airborne control center, following the declaration of an in-flight emergency.

FIG. 4B shows a scenario in which a RITO command originates from an airborne remote control center which is distant from the HAC. Examples of ARCCs include AWACS-type aircraft and interceptor aircraft on their way to a HAC.

In such a scenario, the distance between the ARCC and the to-be-controlled aircraft would be large enough, such that direct, line-of-sight communication would not be possible, and a satellite link would be necessary. Conceptually, a RITO command originating from a distant airborne vehicle is similar to a RITO command originating from a distant terrestrial source.

If, however, the ARCC is close enough to the to-be-controlled aircraft that an uninterrupted, direct line-of-sight link is possible, the scenario would be considered local RITO.

2.3.3 Local RITO

Figure 5:
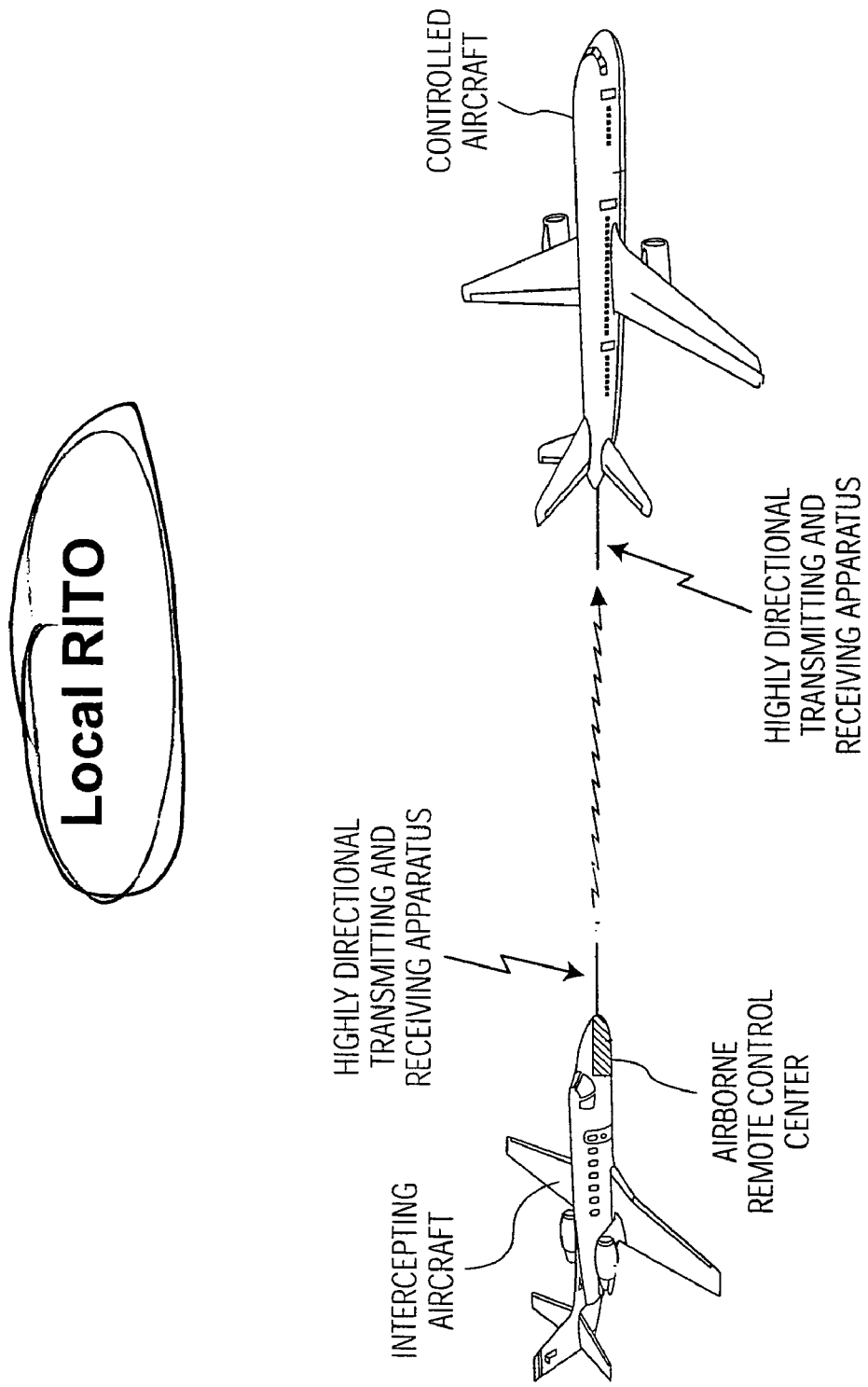
FIG. 5 is a representational diagram showing how a local remote initiated takeover signal may be transmitted from an intercepting aircraft to an aircraft to be controlled, following the declaration of an in-flight emergency by a remote pilot onboard the intercepting aircraft.

As shown in FIG. 5, an in-flight emergency onboard an aircraft may be detected by interceptor aircraft, which has been sent aloft to investigate an aircraft which has been flying erratically, or in an otherwise unauthorized manner. Upon detection of such an in-flight emergency by an interceptor aircraft flying within the rLOS of the HAC, this interceptor aircraft transmits a RITO signal from its onboard airborne remote control center (ARCC) to the aircraft undergoing the emergency. The on-site ARCC may also transmit information about the event to a central ground control center, to other interceptor aircraft and to ground control center at the designated landing field.

Local RITO has the advantage of sending the RITO command over a highly secure link. Communication security in this situation is enhanced by:

(a) very highly directional transmission;

(b) the ability to enhance HAC receiver selectivity by reducing receiver sensitivity, thereby emphasizing locally originating signals; and (c) the ability to enhance HAC receiver selectivity by limiting the angular orientation of received signals e.g., to signals coming only from above the to-be-controlled aircraft (thereby making ground-based hacking attempts less likely to succeed), or even further limiting angular orientation of a potential incoming takeover signal to a narrow range of upwardly oriented angles. A further enhancement of communication security may be obtained by repeatedly changing the vector between the controlled aircraft and the interceptor aircraft by changing the relative positions of the two aircraft.

Two approaches to Local RITO, referred to as "Method 3A" and "Method 3B", are discussed below in Section 3. Method 3A, discussed below and in U.S. patent application Ser. No. 10/328,589 entails a direct transition from MAC State 1 to MAC State 2. Method 3B entails a transition from MAC State 1 to MAC State 3, and later to MAC State 2.

If the remote pilot, initially intending to transmit a RITO signal to the HAC from within the rLOS, instead chooses to send the RITO signal before he is within rLOS of the HAC, then this approach may be considered a variation of Method 2B (or 2A); This is shown in FIG. 4B. This may occur as part of a scenario where the initial intention was Method 3B (or 3A), but because of deteriorating conditions aboard the HAC, it becomes impossible to wait for IAC arrival within the rLOS of the HAC, before switching to autopilot (or distant remote pilot).

2.4 Methods of Remote Control Maintenance

Once the takeover command—whether PITO or RITO—has been given, an intermediate phase of flight ensues in which the source of control for the controlled aircraft will be either: (a) the autopilot; (b) a distant (i.e., not within rLOS) remote pilot (either terrestrial or airborne); or (c) a local (i.e., within rLOS) remote pilot (either terrestrial or airborne). As discussed below, more than one of these methods may be used at different times during the intermediate phase of flight.

The final phase of flight, the landing, would entail any one of the aforementioned methods of control except for the autopilot.

2.4.1 Flight Phase Nomenclature

To simplify discussions below, the flight phases are numbered, and classified according to Table 3, which follows:

TABLE 3

Flight Phases

| Phase | Event | Options | | |
|---|---|---|---|---|
| I | Pre-Emergency | | | |
| II | Takeover | PITO or Distant RITO or Local RITO | | |
| IIIA | Intermediate - Immediately Post TO | AP | Distant Remote Pilot Ground or Air-Based | Local Remote Pilot Air (Ground)-Based |
| IIIB | Intermediate - Post Phase IIIA | AP | Distant Remote Pilot Ground or Air-Based | Local Remote Pilot Air (Ground)-Based |
| IV | Landing | | Distant Remote Pilot Ground or Air-Based | Local Remote Pilot Air or Ground-Based |

The choice of Roman numerals in the naming of the aforementioned phases is intended to distinguish these names from the names of MAC States (1, 2, 3 and 4) and from the flight control "Methods" discussed below (1A, 1B, 2A, 2B, 3A and 3B). The choice of digits or letters for each set of names is not intended to bear any operational relation to the choice of digits or letters for another set of names. In the above Table, the left-right positioning of options for Phase II is not intended to indicate any tendency to be associated with similarly positioned options for Phases III and IV; the actual relationships are discussed in Section 3 below where specific associations of Phase II options and Phase III/IV options are presented.

2.4.2 Autopilot During Phase IIIA

Autopilot control during Phase IIIA is the primary subject of the present invention. It is discussed above in reference to FIG. 1, and below in Sections 3.2.1, 3.2.2, 3.2.3 and 5.1.

2.4.3 Distant Pilot During Phase IIIA

Distant pilot control during Phase IIIA is the discussed in U.S. patent application Ser. No. 10/328,589. It is discussed below in reference to Methods 1A and 2A.

2.4.3.1 Ground Based Distant Pilot

Figure 6:
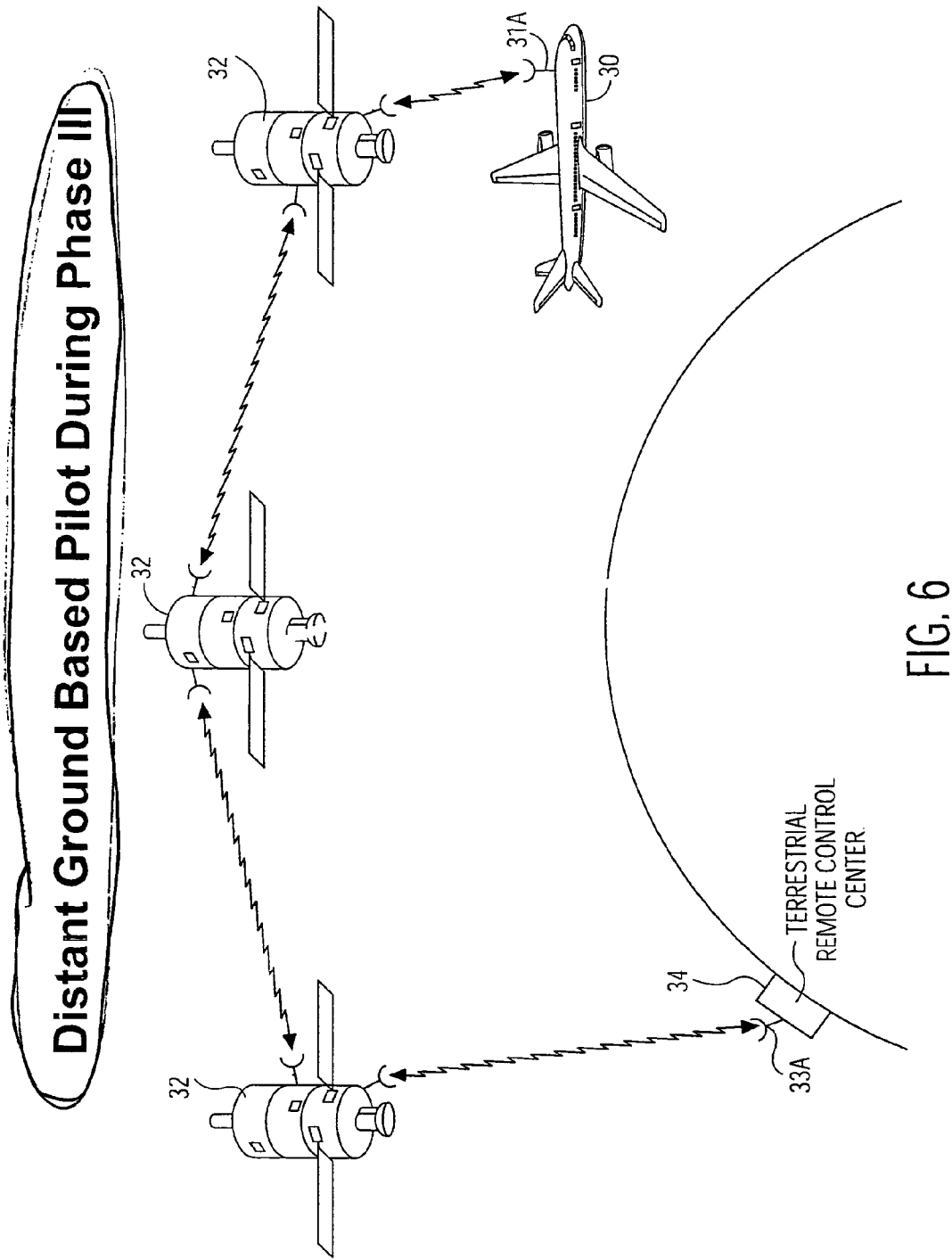
FIG. 6 is a representational diagram showing a two-way communication link, via satellite, between a terrestrial remote control center and an aircraft to be controlled.

FIG. 6 shows the remote control of an aircraft from a distant terrestrial location. One or more satellites may link the ground station to the controlled aircraft. The ground station may be on land or at sea, and all references hereinabove and hereinbelow to "ground" are intended to include both land and sea. There may be repeater networks on the ground, not shown in the figure. Control may be handed off from one ground station to another during the intermediate phase of the flight (or at the time of landing, see below).

Upward orientation of the aircraft antenna makes hacking from the ground less likely. To maximize the efficiency of information transfer between each pair of communicating antennae, information about the location of each antenna (whether GPS-derived or otherwise) may be communicated to the corresponding antenna with which it communicates. This information may be used to orient each of the antennae to maximize received signal amplitude. For example, GPS information indicating the position of aircraft 30, received by satellite 32, may be used to orient satellite antenna 31B; and, information indicating the position of satellite 32, received by aircraft 30, may be used to orient aircraft antenna 31A. Similarly, the antenna pair consisting of 33A and 33B could continuously or semi-continuously re-orient, so that the two antennae face each other, if the satellite is not in geosynchronous orbit.

The ground-based remote control center may be the source of control from the initial moment of Phase IIIA, or it may become the source of control in a later portion of Phase IIIA or IIIB, following control by another source.

2.4.3.2 Air Based Distant Pilot

Figure 7:
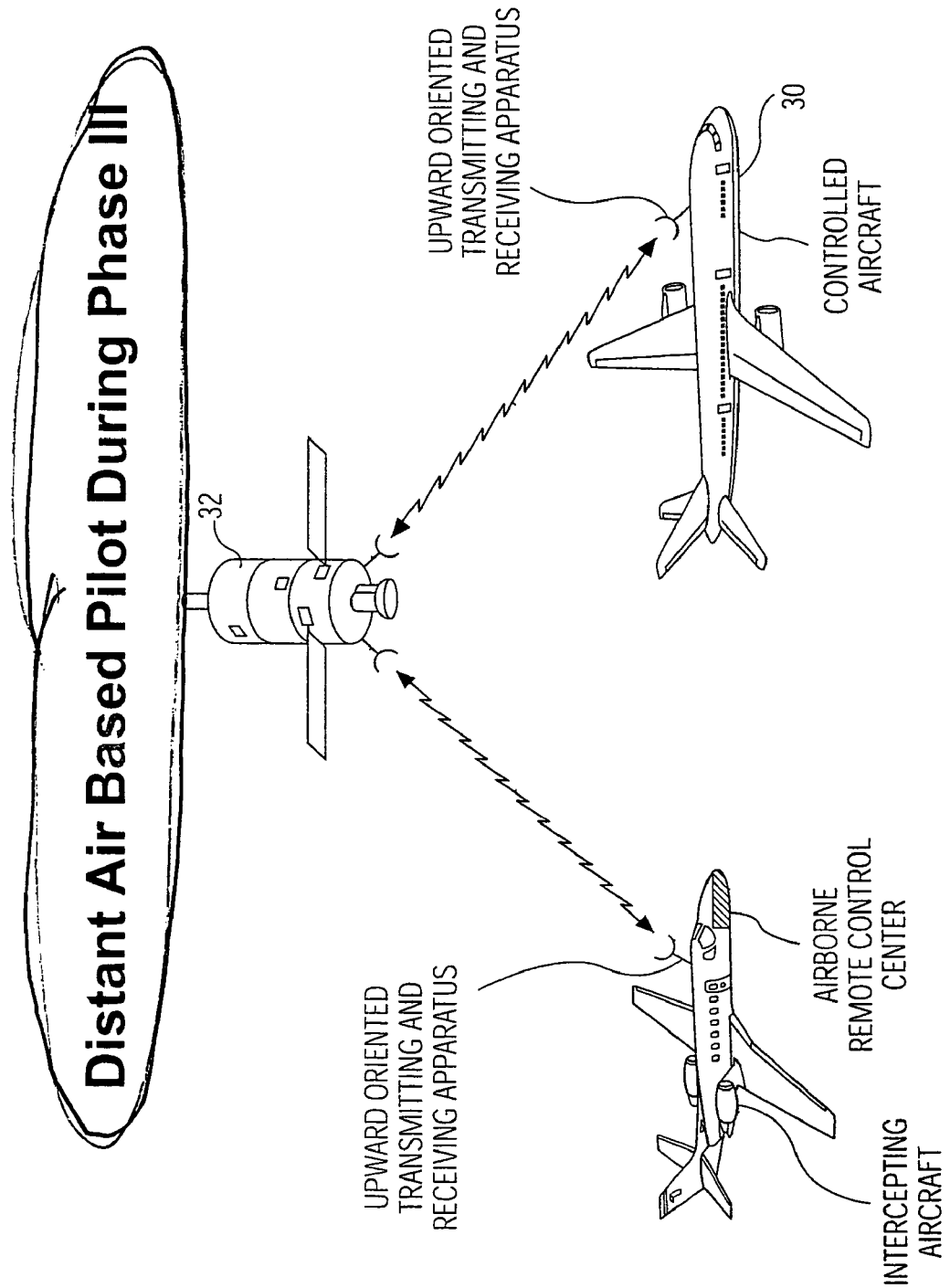
FIG. 7 is a representational diagram showing a two-way communication link, via satellite, between an airborne remote control center and an aircraft to be controlled.

FIG. 7 shows the remote control of an aircraft from a distant airborne location. One or more satellites may link the ground station to the controlled aircraft. Antenna orientation may be controlled as discussed above. The airborne remote control center (ARCC) may be the source of control from the initial moment of Phase IIIA, or control may be handed off to it from another source, e.g., the terrestrial based distant pilot, discussed in Section 2.4.3.1.

The advantages of the distant airborne control center over a distant terrestrial one include:

(a) The distant airborne remote pilot may be en-route to the location of the HAC, allowing for seamless transfer to a more secure, line-of-sight communication modality, on attaining an appropriately short distance from the HAC (at which time the distant airborne remote pilot effectively becomes the local airborne remote pilot—see Section 2.4.4.1. below).

(b) Airborne remote pilot may be better able to detect an inappropriate (i.e., unfriendly) airborne vehicle than a ground based remote pilot (c) The airborne location may make the communication link less susceptible to hacking.

An ARCC may hand off to one or more other ARCCs during the course of an emergency situation.

2.4.4 Local Pilot During Phase IIIA

As discussed above (Section 2.3.3) and below, the value of having the remote control pilot located in close proximity to the HAC is enhanced communications security. In addition, a local pilot has a direct view of the HAC, which supplements that supplied by cameras (which are discussed in U.S. patent application Ser. No. 10/328,589) aboard the HAC.

The terms "local remote pilot" and "local pilot" refer to a remote control pilot whose distance from the controlled aircraft is less than or equal to the rLOS, as defined above.

2.4.4.1 Air Based Local Pilot

Figure 8:
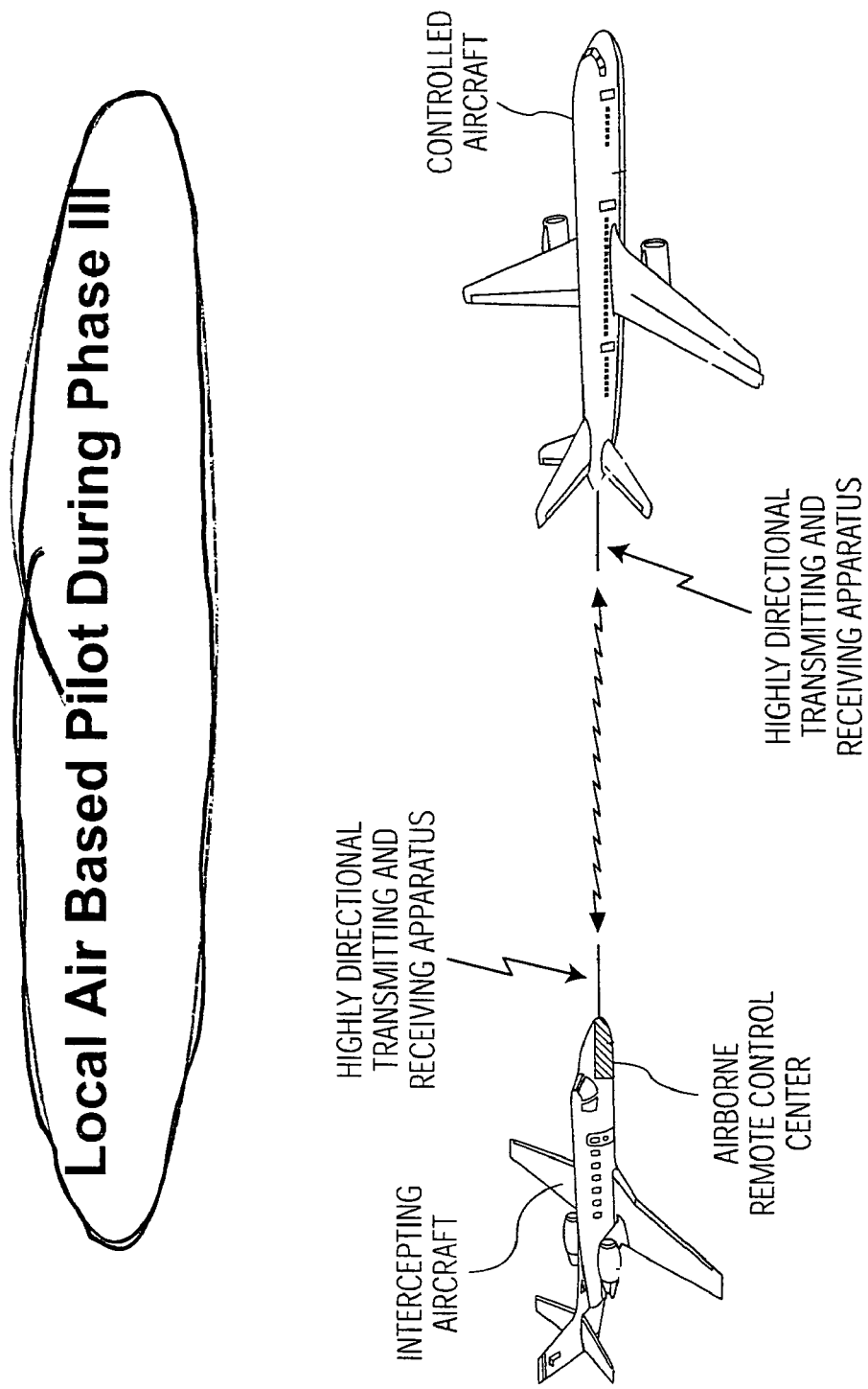
FIG. 8 is a representational diagram showing the use of a highly directional, short range, two-way communication link between an interceptor aircraft and an aircraft to be controlled.
Figure 9:
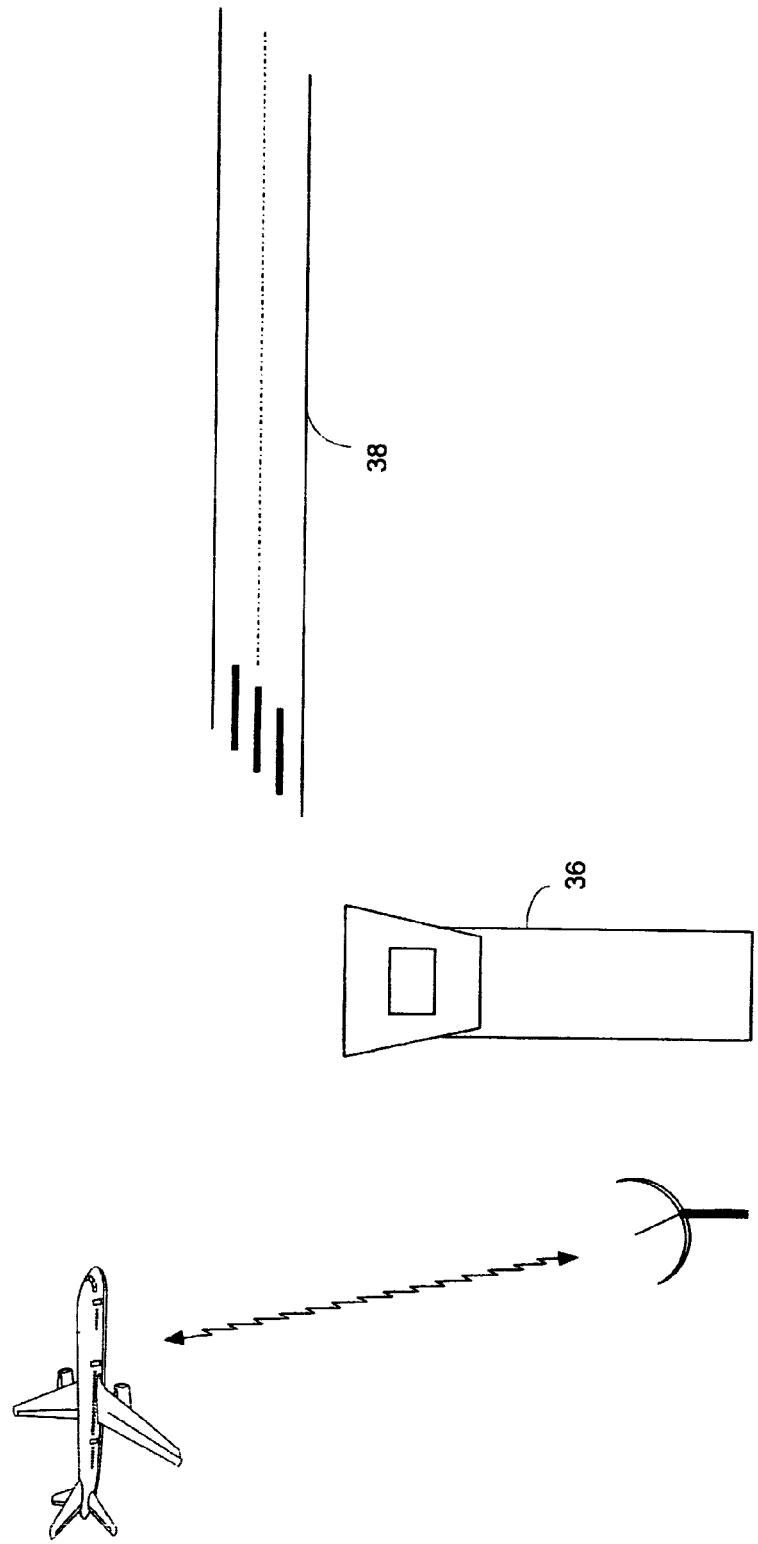
FIG. 9 is a representational diagram showing the use of a highly directional, short range, two-way communication link between a control tower and an aircraft to be controlled.

FIG. 8 shows an Airborne Remote Control Center aboard an IAC (interceptor aircraft) (IAC) which is flying within the rLOS of the controlled aircraft. Communication between the two aircraft is via highly directional transmitting and receiving apparatus, as discussed above. The IAC may be a fixed wing aircraft or it may be a helicopter. In addition, it is possible that during flight Phase IIIA or IIIB, control may be handed of from one intercepting aircraft to another. This may occur one or more times. For example, it would be possible for (a) the first intercepting aircraft to be a high velocity aircraft, and (b) as the controlled aircraft approaches the landing field, control is handed off to a lower velocity aircraft (e.g., a chase plane or a helicopter).

2.4.4.2 Ground Based Local Pilot

When the controlled aircraft reaches the rLOS of the designated landing field, control may be handed off from whichever source of control was in effect (autopilot, distant remote pilot or local remote pilot) to a local ground-based pilot. This ground-based pilot may be in the control tower 36 of the designated landing field, or near it, as shown in FIG. 9. In one embodiment of the invention, this remote pilot would have a direct view of the runway 38. Alternatively, there could be more than one ground based pilot along the approach to the designated airfield, with each such remote pilot handing off control to the next, as the controlled aircraft passes the outer limit of the rLOS of each of the respective ground based pilots. It is also possible to have a plurality of ground-based antennae along the landing path of the HAC. In this case, it is possible to limit communication to within rLOS by selecting a sequence of antennae as the HAC passes over.

Local ground-based remote control would also be possible at one or more points which are not necessarily near the designated landing field. In this situation, the local ground station would, as the controlled aircraft reaches the outer limit of its secure communications range, hand off control to either: (a) another local ground-based pilot, (b) an air-based local pilot, (c) a distant pilot, or (d) the autopilot aboard the controlled aircraft.

2.5 Options for Control During Phase IIIB

In general, the options for flight control during Phase IIIB will be the same as those during Phase IIIA. However, there will be few, if any instances where it will be desirable to switch from a more secure means of control to a less secure one. Such unlikely scenarios include:

(a) those in which control during IIIA is autopilot, and control during IIIB is distant remote pilot; and (b) those in which control during IIIA is local remote pilot and control during IIIB is distant remote pilot.

2.6 Options for Landing

The controlled aircraft is landed by a remote pilot located either:

(a) at a distant ground-based remote control center, as described in U.S. patent application Ser. No. 10/328,589;

(b) at a distant airborne remote control center, as described in U.S. patent application Ser. No. 10/328,589;

(c) at a local airborne remote control center, as described herein; or (d) at a local ground-based remote control center, as described herein.

3. Details of Aircraft Control Methods

Based on the entries in Table 3, the number of combinations of a Phase II choice (three options), a Phase IIIA choice (three options) and a Phase IIIB choice (three options) is twenty seven (i.e., 3×3×3).

Of these twenty seven combinations, thirteen relate to scenarios which are somewhat unlikely to be common including:

(a) Seven combinations which involve switching from a more secure means of control (e.g., autopilot or local pilot during Phase IIIA) to a less secure means (e.g., distant pilot during Phase IIIB), where the word 'secure' herein refers to susceptibility to interference by a hacker. Another such example would be Phase II=Local RITO and Phase IIIA=distant remote pilot.

(b) Six combinations which seem somewhat unlikely from a situational point of view, i.e., those in which PITO or distant RITO are followed by control by a local remote pilot.

3.1 Nomenclature

The remaining fourteen combinations can be grouped into six methods. Three of the six involving autopilot control during Phase IIIA (i.e., immediately after the onset of TO) are the subject of the present invention: Methods 1B, 2B and 3B. The other three methods involve control by either a distant or local remote pilot during Phase IIIA, and are the subject of U.S. patent application Ser. No. 10/328,589: Methods 1A, 2A and 3A. These six methods are presented in Table 4, below:

TABLE 4

Six Methods of Flight Control, Overview

| Phase II = | Phase IIIA = AUTOPILOT | Phase IIIA = REMOTE PILOT |
|---|---|---|
| PITO | Method 1B | Method 1A |
| Distant RITO | Method 2B | Method 2A |
| Local RITO | Method 3B | Method 3A |

A more detailed exposition shows the range of options for Phases IIIB and IV associated with each of the six methods. It is shown below in Table 5:

TABLE 5

Six Methods of Flight Control, Detailed View

Method:

| | Phase II | Phase IIIA | Phase IIIB | Phase IV |
|---|---|---|---|---|
| 1B | PITO | Autopilot | Autopilot or Local Remote Pilot | Local Remote Pilot |
| 2B | Distant RITO | Autopilot | Autopilot or Local Remote Pilot | Local Remote Pilot |
| 3B | Local RITO | Autopilot | Autopilot or Local Remote Pilot | Local Remote Pilot |
| 1A | PITO | Distant Remote Pilot | Distant or Local Remote Pilot | |
| 2A | Distant RITO | Distant Remote Pilot | Distant or Local Remote Pilot | |
| | Local RITO | | Local Remote Pilot | |

Each listing of "distant remote pilot" is intended to include scenarios with an air or ground based remote pilot. In Section 4 scenarios in which there may be one or more of such entities are presented. The same remarks apply to entries of "local remote pilot."

In some scenarios, the source of control for one phase may be identical to the source of control for one or both adjacent phases. For example: In Method 1A, a distant remote pilot may be the source of control for both Phases IIIA and IIIB, or for Phases IIIA, IIIB and IV.

In the six Sections which follow, each of methods is described in detail. More complex methods are discussed in Section 4. Other methods, which allow remote control of an aircraft with an in-flight emergency, will occur to those skilled in the art.

3.2 Methods with Intermediate Autopilot Control

In the flow diagrams which follow in Sections 3.2 and 3.4, the first of three lines of boxes refers to events which occur on the to-be controlled, controlled, possibly hijacked or (actually) hijacked aircraft, i.e., the HAC. The second of three lines of boxes generally refers to events at a distant remote control center, i.e., a terrestrial (TRCC) or airborne (ARCC) remote control center. The third line refers to events at a local remote control center, either ground based, or, as in a preferred embodiment of the invention, aboard an IAC.

Within each of the six subsections, each of sub-paragraphs (1) through (6) refer to the corresponding columns of the figure; e.g., the events in column 3 are described in sub-paragraph (3).

Additional discussion of each of the methods appears in the Sections pertaining to FIGS. 16, 18 (Methods 1B and 2E) and 19 (Method 3B).

3.2.1 Method 1B, PITO

Method 1B is defined, hereinabove and hereinbelow as that method in which PITO (Phase II) is followed immediately by a transition from onboard pilot control to autopilot control (Phase IIIA).

Figure 10:
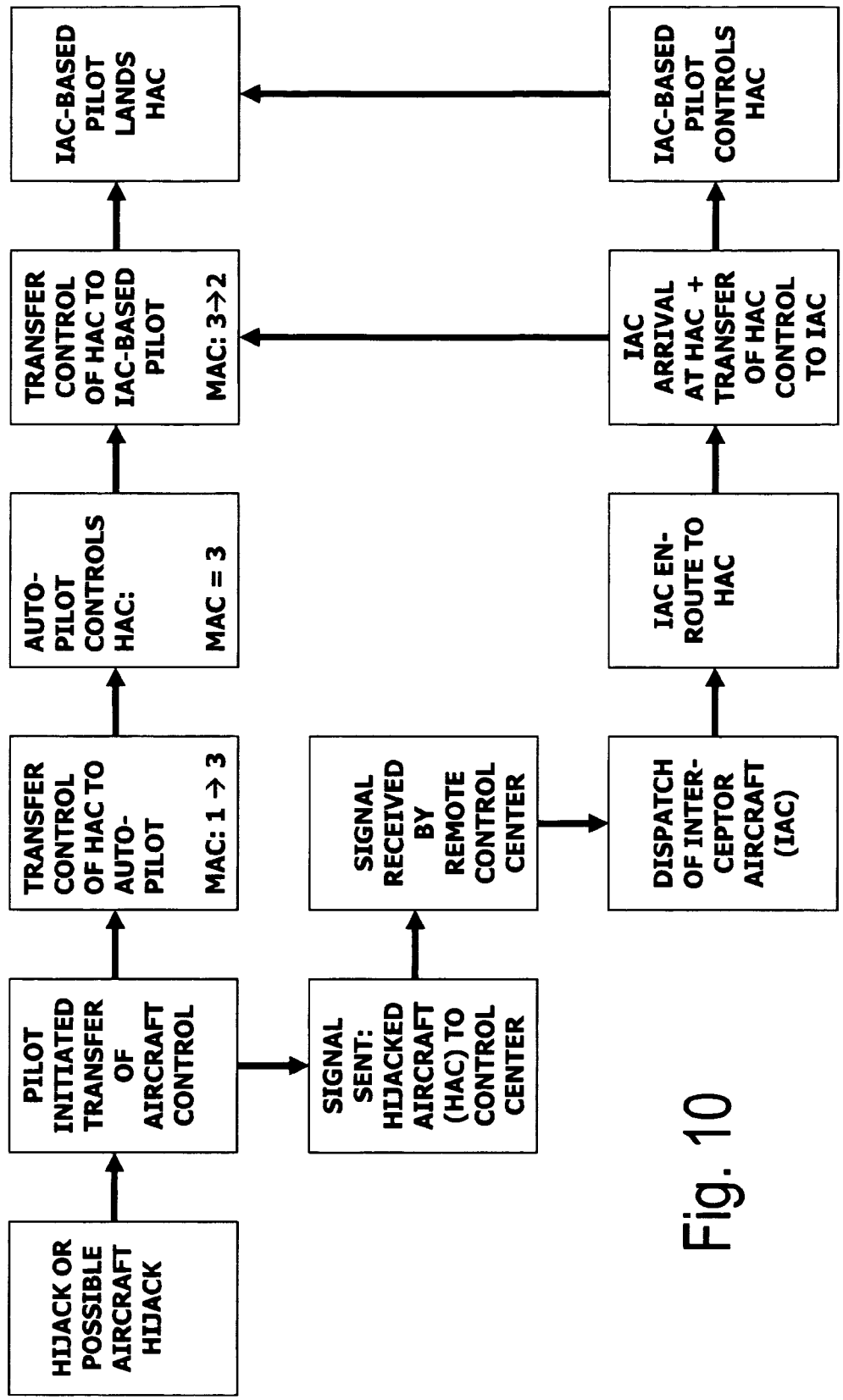
FIG. 10 illustrates one possible sequence of events following the declaration of an in-flight emergency on an aircraft.

As shown in FIG. 10, Method 1B entails the following sequence of events:

(1) An actual or potential aircraft hijacking or emergency in which the onboard pilot(s) would be incapable of properly controlling their aircraft;

(2) The pilot and/or one or more other appropriate onboard person(s) issue a PITO signal which is transmitted from the HAC to the distant Remote Control Center or "RCC";

(3) The RCC dispatches an IAC to the rLOS of the HAC; meanwhile, aboard the HAC, control is transferred from the onboard pilot to the autopilot, coincident with a transition from MAC State 1 to MAC State 3;

(4) The HAC remains under autopilot control (MAC State 3) while the IAC is en-route to the HAC;

(5) When the IAC arrives at the HAC, it signals the HAC, and after identification confirmation, a command is sent to the HAC causing a transition to IAC-based control of the HAC, coincident with a transition from MAC State 3 to MAC State 2. This transition marks the start of Phase IIIB;

(6) When the HAC-IAC pair arrives at the designated landing field, the IAC pilot (i.e., the local remote pilot) lands the HAC.

Variations on the theme of Method 1B include:

(a) A ground-based local remote pilot (e.g., one in the control tower) lands the HAC; and (b) More complex variations, discussed in Section 4.

3.2.2 Method 2B, Distant RITO

Method 2B is defined, hereinabove and hereinbelow as that method in which distant RITO (Phase II) is followed immediately by a transition from onboard pilot control to autopilot control (Phase IIIA).

Figure 11:
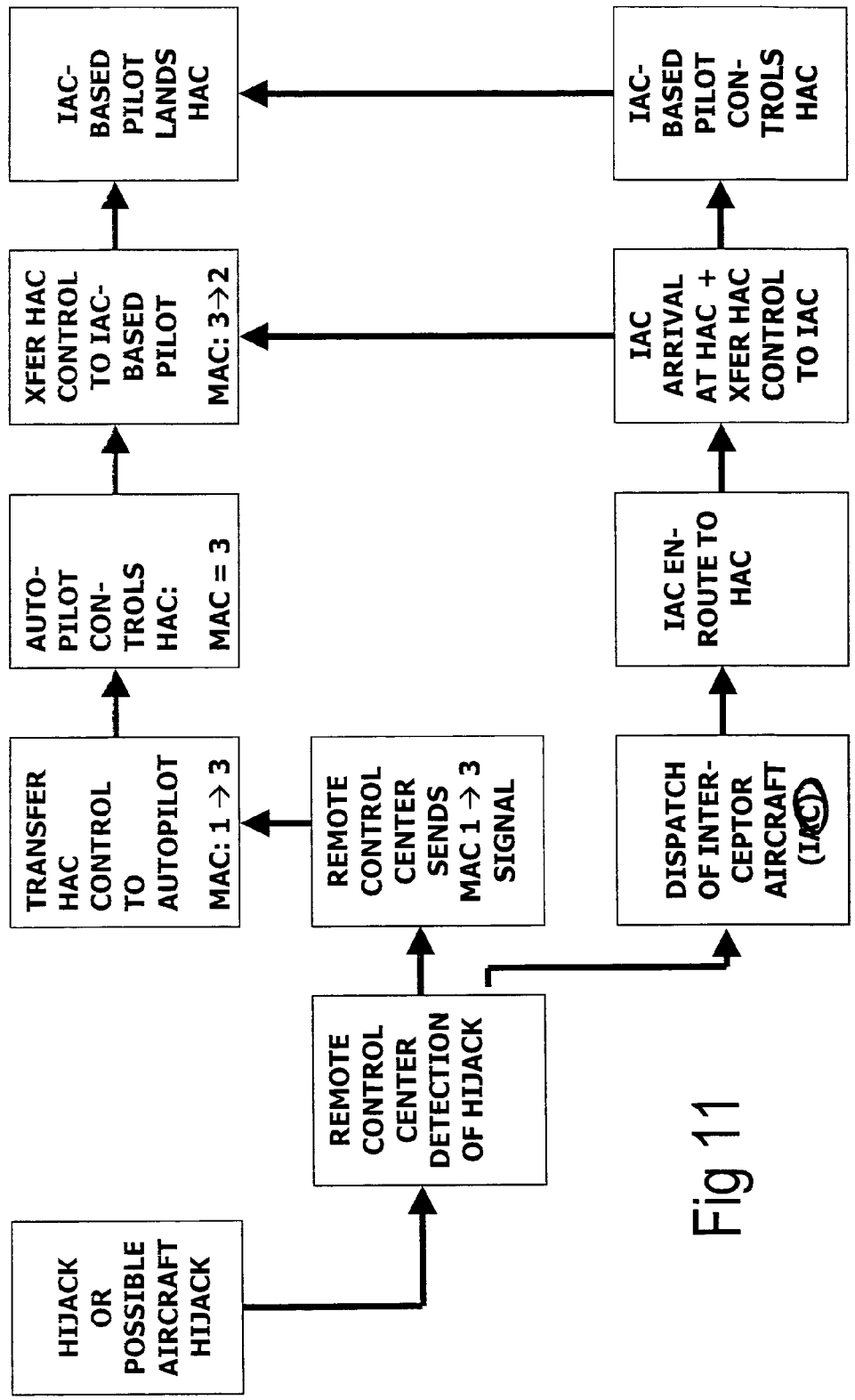
FIG. 11 illustrates another possible sequence of events following the declaration of an in-flight emergency on an aircraft.

As shown in FIG. 11, Method 2B entails the following sequence of events:

(1) An actual or potential aircraft hijacking or emergency;

(2) The RCC becomes aware of the event;

(3) The RCC dispatches an IAC to the rLOS of the HAC; meanwhile, the RCC sends a signal to the HAC which transfers control of the HAC from the onboard pilot to the autopilot, coincident with a transition from MAC State 1 to MAC State 3;

(4) The HAC remains under autopilot control (MAC State 3) while the IAC is en-route to the HAC;

(5) When the IAC arrives at the HAC, it signals the HAC, and after identification confirmation, a command is sent to the HAC causing a transition to IAC-based control of the HAC, coincident with a transition from MAC State 3 to MAC State 2;

(6) When the HAC-IAC pair arrives at the designated landing field, the IAC pilot lands the HAC.

Variations on the theme of Method 2B include:

(a) A ground-based local remote pilot (e.g., one in the control tower) lands the HAC; and (b) More complex variations, discussed in Section 4.

3.2.3 Method 3B, Local RITO

Method 3B is defined, hereinabove and hereinbelow as that method in which local RITO is followed immediately by a transition from onboard pilot control to autopilot control.

Figure 12:
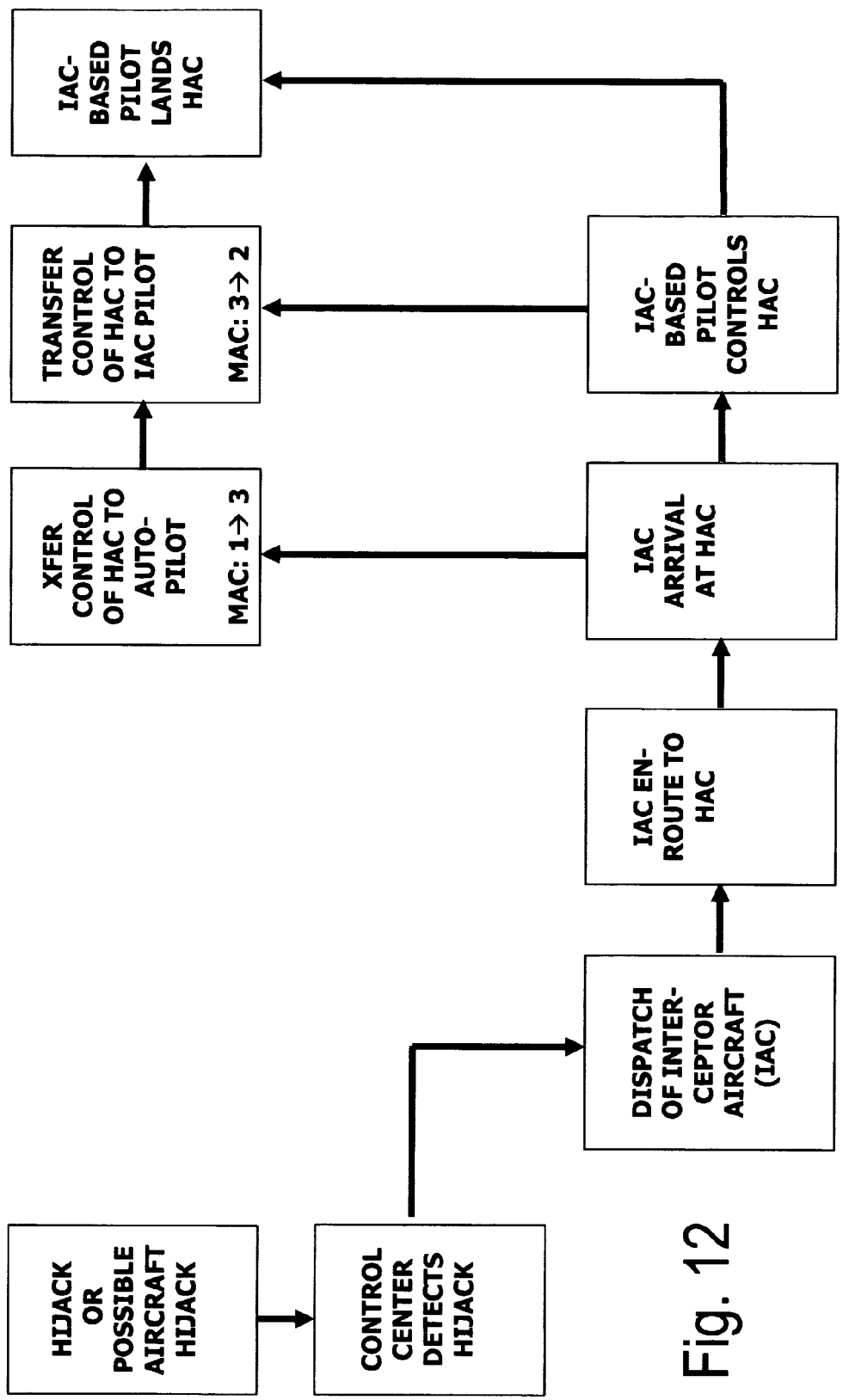
FIG. 12 illustrates still another possible sequence of events following the declaration of an in-flight emergency on an aircraft.

As shown in FIG. 12, Method 3B entails the following sequence of events:

(1) An actual or potential aircraft hijacking or emergency; The RCC becomes aware of the event, as discussed above;

(2) The RCC dispatches an IAC to the rLOS of the HAC. In contrast to Method 2B, the distant RCC does not send a signal to the HAC to transfer control of the HAC from the onboard pilot to the autopilot. That transfer signal is not sent until the IAC is within the rLOS of the HAC; An advantage of this approach—in which transmission of the transfer signal is delayed until arrival of the IAC within the rLOS of the HAC—is that avoidance of long range transmission of such a signal adds a degree of security (with regard to the ability of unauthorized persons to transmit such a signal);

(3) The HAC remains under control of the onboard pilot while the IAC is en-route to the HAC. This is a disadvantage of Method 3B;

(4) When the IAC arrives at the HAC, it signals the HAC, and after identification confirmation, a command is sent to the HAC causing a transition to autopilot control of the HAC, coincident with a transition from MAC State 1 to MAC State 3. This command is considered to be the local RITO. The IAC pilot then flies within the rLOS of the HAC, but the autopilot controls the HAC. Having the autopilot control the HAC (a) may confer greater communications security, since it would allow a period of "radio silence," and (b) may simplify the job of the IAC pilot.

(5) At the time that the HAC-IAC pair arrives at the designated landing field, or sooner, the IAC pilot takes control of the HAC; coincident with a transition from MAC State 3 to MAC State 2;

(6) The IAC pilot lands the HAC.

Variations on the theme of Method 3B include:

(a) A ground-based local remote pilot (e.g., one in the control tower) lands the HAC; and (b) More complex variations, discussed in Section 4.

3.3 Methods without Intermediate Autopilot Control

These methods are the subject of U.S. patent application Ser. No. 10/328,589, in which they are discussed without reference to the "phase" and "method" formalism used herein. They are described hereinbelow using such formalism. Such a description illustrates the parallels between Methods 1A and 1B, between Methods 2A and 2B and between Methods 3A and 3B.

3.3.1 Method 1A, PITO

Method 1A is defined, hereinabove and hereinbelow as that method in which PITO (Phase II) is followed immediately by a transition from onboard pilot control to distant remote control (Phase IIIA).

Figure 13:
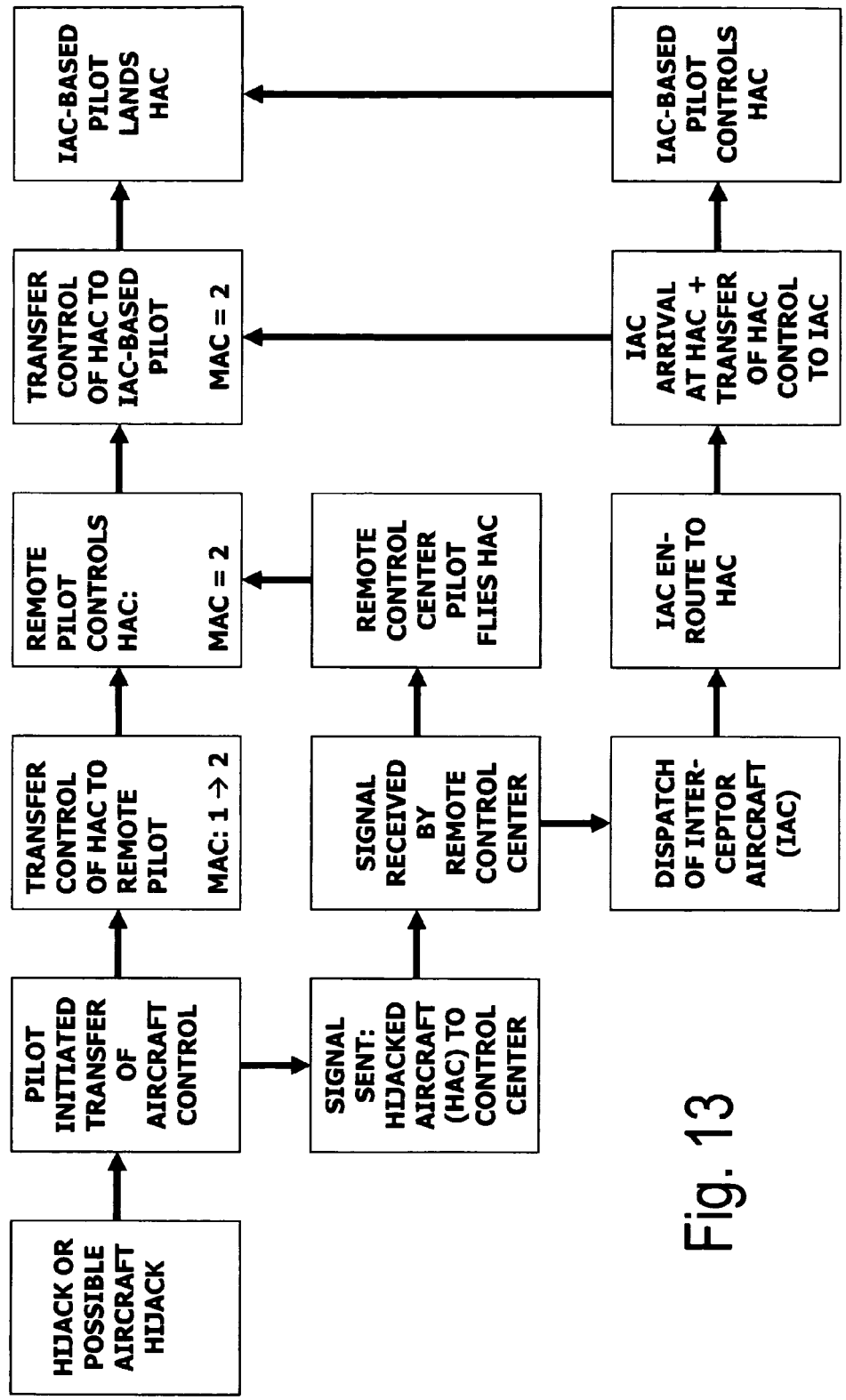
FIG. 13 illustrates still another possible sequence of events following the declaration of an in-flight emergency on an aircraft.

As shown in FIG. 13, Method 1A entails the following sequence of events:

(1) An actual or potential aircraft hijacking or emergency;

(2) The pilot and/or one or more other appropriate onboard persons issue a PITO signal which is transmitted from the HAC to the distant RCC;

(3) The RCC dispatches an IAC to the rLOS of the HAC; meanwhile, aboard the HAC, control is transferred from the onboard pilot to the distant remote pilot in the remote control center (whether ground-based or airborne), coincident with a transition from MAC State 1 to MAC State 2;

(4) The HAC remains under distant remote pilot control (MAC State 2) while the IAC is en-route to the HAC;

(5) When the IAC arrives at the HAC, it signals the HAC, and after identification confirmation, a command is sent to the HAC causing a transition to IAC-based control of the HAC. The MAC state, 2, is does not change with this transition from distant remote pilot to local remote pilot. This transition marks the start of Phase IIIB;

(6) When the HAC-IAC pair arrives at the designated landing field, the IAC pilot lands the HAC.

Variations on the theme of Method 1A include:

(a) The IAC-based local remote pilot transfers control of the HAC to a ground-based local remote pilot (e.g., one in the control tower), and the latter lands the HAC;

(b) The distant remote pilot does not transfer control to a local remote pilot, retaining control either through the landing, or transferring control to a ground-based remote pilot within the rLOS of the designated landing field;

(c) The distant remote pilot, at some point transfers control to the autopilot—either optionally or because of a communications interruption. At some later point, prior to landing, control is transferred to either the distant remote pilot or a local remote pilot; and (d) More complex variations, discussed in Section 4.

3.3.2 Method 2A, Distant RITO

Method 2A is defined, hereinabove and hereinbelow as that method in which distant RITO is followed immediately by a transition from onboard pilot control to distant remote control.

Figure 14:
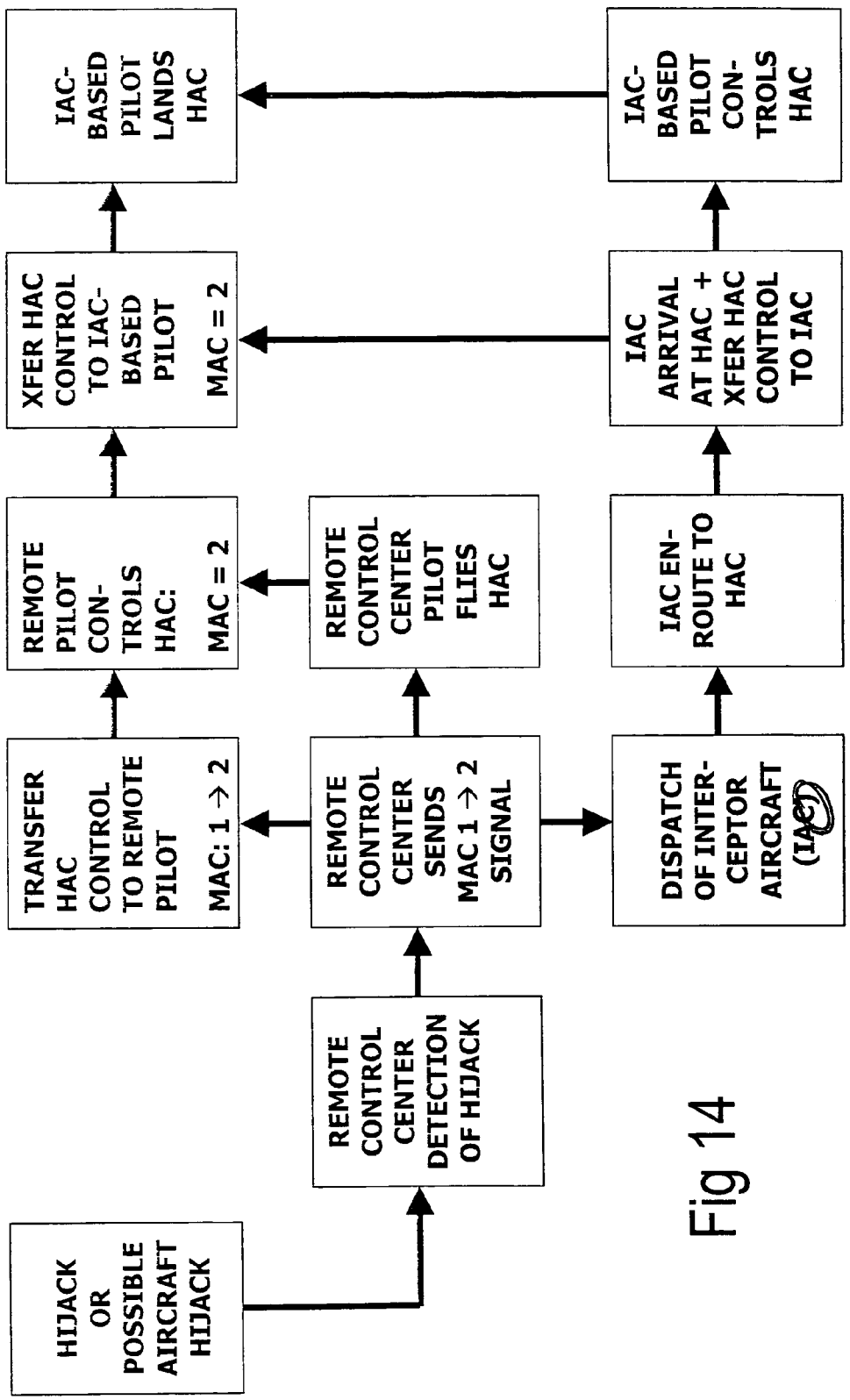
FIG. 14 illustrates still another possible sequence of events following the declaration of an in-flight emergency on an aircraft.

As shown in FIG. 14, Method 2A entails the following sequence of events:

(1) An actual or potential aircraft hijacking or emergency;

(2) The RCC becomes aware of the event;

(3) The RCC dispatches an IAC to the rLOS of the HAC; meanwhile, the RCC sends a signal to the HAC which transfers control of the HAC from the onboard pilot to the distant remote pilot in the remote control center (whether ground-based or airborne), coincident with a transition from MAC State 1 to MAC State 2;

(4) The HAC remains under distant remote pilot control (MAC State 2) while the IAC is en-route to the HAC;

(5) When the IAC arrives at the HAC, it signals the HAC, and after identification confirmation, a command is sent to the HAC causing a transition to IAC-based control of the HAC. The MAC state, 2, is does not change with this transition from distant remote pilot to local remote pilot. This transition marks the start of Phase IIIB;

(6) When the HAC-IAC pair arrives at the designated landing field, the IAC pilot lands the HAC.

Variations on the theme of Method 2A include:

(a) The IAC-based local remote pilot transfers control of the HAC to a ground-based local remote pilot, and the latter lands the HAC;

(b) The distant remote pilot does not transfer control to an airborne local remote pilot, retaining control either through the landing, or transferring control to a ground-based remote pilot when the HAC is within the rLOS of the designated landing field;

(c) The distant remote pilot, at some point transfers control to the autopilot—either optionally or because of a communications interruption. At some later point, prior to landing, control is transferred to either the distant remote pilot or a local remote pilot; and (d) More complex variations, discussed in Section 4.

3.3.3 Method 3A, Local RITO

Method 3A is defined, hereinabove and hereinbelow as that method in which local RITO is followed immediately by a transition from onboard pilot control to local remote pilot control.

Figure 15:
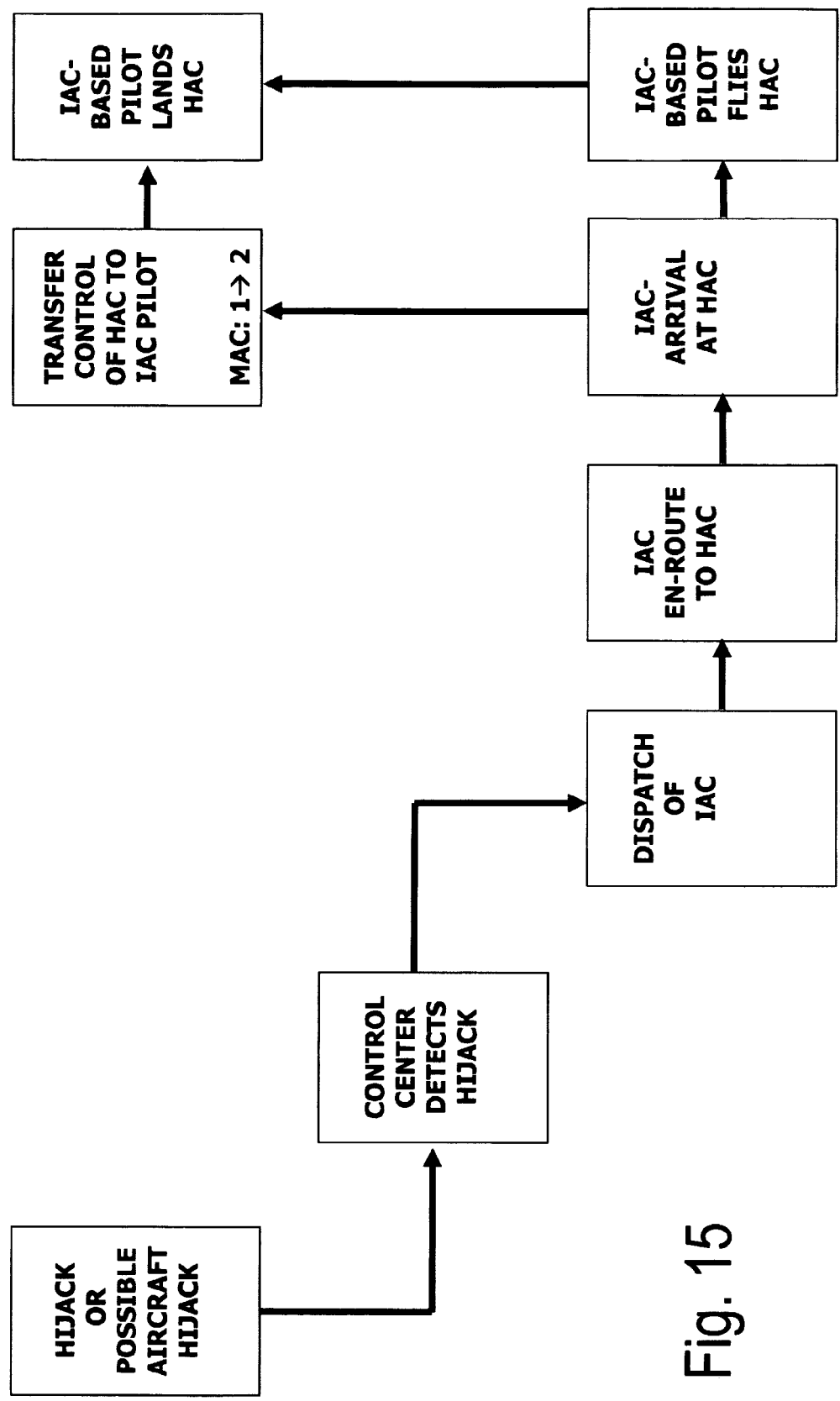
FIG. 15 illustrates still another possible sequence of events following the declaration of an in-flight emergency on an aircraft.

As shown in FIG. 15, Method 3A entails the following sequence of events:

(1) An actual or potential aircraft hijacking or emergency;

(2) The RCC becomes aware of the event;

(3) The RCC dispatches an IAC to the rLOS of the HAC. In contrast to Method 2A, the distant RCC does not send a signal to the HAC to transfer control of the HAC from the onboard pilot to the distant remote pilot. As is the case with Method 3B, that transfer signal is not sent until the IAC is within the rLOS of the HAC. An advantage of this approach—in which transmission of the transfer signal is delayed until arrival of the IAC within the rLOS of the HAC—is that avoidance of long range transmission of such a signal adds a degree of security;

(4) The HAC remains under control of the onboard pilot while the IAC is en-route to the HAC. This is a disadvantage of Method 3A;

(5) When the IAC arrives at the HAC, it signals the HAC, and after identification confirmation, a command is sent to the HAC causing a transition to local remote pilot control of the HAC, coincident with a transition from MAC State 1 to MAC State 2. This command is considered to be the local RITO;

(6) The IAC-based local remote pilot then controls the HAC.

When the HAC-IAC pair arrives at the designated landing field, the IAC pilot lands the HAC.

Variations on the theme of Method 3A include:

(a) A ground-based local remote pilot lands the HAC; and (b) The local remote pilot, at some point transfers control to the autopilot—either optionally or because of a communications interruption. At some later point, prior to landing, control is transferred to a local remote pilot;

(c) More complex variations, discussed in Section 4.

3.4 Total Number of Combinations, Non-Complex Methods

As can be seen from Sections 3, 3.1, 3.2 and 3.3, out of a total number of twenty seven possible ways of combining the options for possible Phase II (three choices), Phase IIIA (three choices) and Phase IIIB (three choices), fourteen4 are more obviously feasible, and these may be grouped as six methods, 1A through 3B.

Other numerical assessments of the total number of choices can be made taking into account that:

(a) Phase IV, i.e., landing, can be accomplished by either a distant or a local remote pilot.

(b) Each of the "distant remote pilot" options actually consists of two possible options, a distant remote air-based pilot and a distant remote ground-based pilot. This increases the number of Phase IIIA and Phase IIIB options from three to five and the number of Phase IV options from two to four.

The aforementioned leads to the following accounting of the number of possible combinations of options, when Phase IV is included in the combination:

(a) number of combinations without taking into account air vs. ground source of control (the product of the number of options for Phase II, Phase IIIA, Phase IIIB and Phase IV): 3×3×3×2=54;

(b) number of combinations taking into account air vs. ground source of control: 3×5×5×4=300.

As indicated in Section 3 (where fourteen of twenty seven possible combinations of Phases II, IIIA and IIIB were felt to be practical, not all of the combinations herein lead to obviously practical scenarios. Nevertheless, it is clear that the total number of combinations included in each of the six methods 1A through 3B is, in practice a number substantially larger than the fourteen originally discussed.

4. Complex Methods: Handoffs During Phases III and IV

Five classes of "handoff"; i.e., the transfer of HAC control from one agent (e.g., a first IAC) to another (e.g., a second IAC) are discussed hereinbelow. Such handoffs, if they occur, are understood to take place within either Phase IIIA, Phase IIIB or Phase IV. Handoffs increase the versatility of the invention. They are intended to increase the security, reliability and speed of response. Their inclusion will increase the number of possible combinations of options, compared with an accounting which does not include handoffs.

4.1 IAC-1 Pilot to IAC-2 Pilot

During either of Phases IIIA, IIIB or IV, a local air-based remote pilot (i.e., an interceptor aircraft-based pilot) may handoff control to another IAC-based pilot. In such circumstance, the handoff is said to be from a first IAC-based pilot to a second IAC-based pilot, or, in more concise terminology, from an IAC-1 pilot to an IAC-2 pilot.

For example, early in the remote controlled portion of the flight, the choice of ideal IAC may be one that arrives on the scene as quickly as possible—e.g., a jet capable of high velocity. On the other hand, during the approach to the designated airfield, a different aircraft—e.g., a slower moving airplane or a helicopter may be better able to maintain a short distance between itself and the HAC. The advantages of the shorter distance include (a) more secure communications and (b) better judgment of the adequacy of the landing approach, i.e., a greater ability to see and feel things from the perspective of the HAC cockpit.

A handoff from IAC-1 pilot to IAC-2 pilot could take place during Phase IIIB or IV of any of the Methods 1A, 2A, 1B, 2B or 3B (See Table 5, above.). During Method 3A, in which Phases IIIA and IIIB are not distinct from each other, it could take place during Phase III or Phase IV.

More than one IAC to IAC handoff is possible during a single flight. For example:

(a) It is possible to have a series of handoffs among a plurality of IACs during one phase; and (b) It is possible to have one or more handoffs among IACs during Phase III and one or more such handoffs during Phase IV.

4.2 Local Ground Pilot-1 to Local Ground Pilot-2

In a manner analogous to the IAC-pilot to IAC-pilot handoffs which were the subject of Section 4.1, there may be one or more handoffs from one local ground pilot to another.

The likely time when such a scenario might occur would be during the approach to the landing field. In this situation, the final local ground pilot might be based in the control tower of the designated airfield (FIG. 9). The potential advantages of such handoffs are improved communication security and quality and better visualization of the HAC by the remote ground-based pilot.

It is also possible that such handoffs might occur earlier in the flight, i.e., before the approach to the landing field.

4.3 Local Ground Pilot to IAC-Based Pilot

It is possible that during a period of local ground pilot control, within any of Phases IIIA, IIIB or IV, it may become desirable to handoff control to an IAC-based pilot. Such circumstances include:

(a) It becomes apparent that the visual perspective from the air is better than that from the ground;

(b) the need to "go around again," i.e., to repeat the approach to the landing strip during a landing in which there was IAC control just prior to local ground pilot control (e.g., from the control tower);

(c) last minute abort of a designated airfield choice; e.g., the abort takes places after control of the HAC was transferred to the control tower;

(d) the malfunction of a local ground station;

(e) a situation where an IAC pilot was desirable but initially not available, followed by the IAC pilot becoming available. This may occur:

(i) due to temporary IAC equipment malfunction, which subsequently is repaired;

(ii) due to late arrival of an IAC at the scene of the HAC, i.e., arrival after a local ground pilot was available; or (iii) due to a resolved combat situation involving an IAC (i.e., The IAC was temporarily not available during the combat situation.).

(f) during local ground control, as the HAC moves out of range of the local ground pilot, and there is no adjacent local ground pilot to handoff to (and there is an available IAC pilot to handoff to;

(g) as a security measure. This could occur if there is an actual of possible source of signal transmission by unauthorized person(s) on the ground. Under such conditions, susceptibility of the HAC receiver to signals originating from the ground is decreased by switching from ground based local pilot control (with downward HAC antenna orientation) to air-based local pilot control from an IAC which is either above the HAC (with upward HAC antenna orientation), or from an IAC which is in approximately the same plane as the HAC (with horizontal HAC antenna orientation). As discussed in Section 2.3.3, other IAC-based communications enhancements (related to limitation and variation of the spatial angles from which signals are received by the HAC) would also be possible. The remarks with regard to IAC antenna orientation are relevant to any phase of the flight with HAC control by the IAC.

4.4 Distant Ground Pilot-1 to Distant Ground Pilot-2

In Methods 1A and 2A, it would be possible to transfer control from one distant ground-based pilot to another. This process may be repeated one or more times. Reasons for such transfer may relate to communications issues, i.e.,:

(a) Transfer may be from a more distant to a less distant terrestrial remote control center. This decrease in distance may (i) improve the quality of the communications, and, (ii) by decreasing the number of ground-based repeaters and cable links between the TRCC and the HAC, make communications more secure.

(b) Repeated handoffs, thereby avoiding a fixed transmission route, may make hacking more difficult. Other reasons for such transfers include:

(a) a malfunction in a TRCC; and (b) transfer to a different TRCC because of a security threat in proximity to the TRCC which, at the time of such transfer, is controlling the HAC.

4.5 IAC-based Pilot to Distant Ground Pilot

This situation could occur in the event of IAC malfunction (including the IAC itself and/or IAC-based communications equipment). It could also occur in the event of the IAC becoming unable to participate in HAC control, because a combat event arises involving the IAC, while the IAC was controlling the HAC.

4.6 Example of Complex, Highly Secure Combination of HAC Control Options

The following example of Method 3B scenario illustrates how a series of handoffs may allow for highly secure HAC control:

Steps (1) to (4) are identical to those described above in Section 3.2.3, i.e.,:

(1) An actual or potential aircraft hijacking or emergency;

(2) The RCC dispatches a high speed IAC to the rLOS of the HAC. To enhance communications security, the distant RCC does not send any control signals to the HAC;

(3) The HAC remains under control of the onboard pilot while the IAC is en-route to the HAC;

(4) When the IAC arrives at the HAC, it signals the HAC, and after identification confirmation by the HAC equipment, a command is sent to the HAC causing a transition to autopilot control of the HAC. The IAC pilot then flies within the rLOS of the HAC, but the autopilot controls this portion of the HAC flight, unless there is evidence of need for human pilot control (i.e., inadequate control by the autopilot or the need for midcourse corrections [e.g., because of a change in weather or a change in the designated landing field]), in which case the IAC-based remote pilot intervenes. This period of predominant or exclusive autopilot control confers greater communications security, by allowing a period of relative or absolute "radio silence," with respect of IAC-HAC communication.

(5) At the time that the HAC-IAC pair nears the designated landing field, control of the HAC is handed off to a second IAC pilot aboard a slower moving interceptor aircraft. During this phase of the flight, the slower moving IAC-2 may be better able to closely follow the HAC than would the rapidly moving IAC-1. The IAC-2 based remote pilot flies the HAC.

(6) The HAC is landed by either:

(a) the IAC-2 based remote pilot; or, (b) after appropriate handoff, a ground-based remote pilot situated in or near the control tower.

5. Flight Control Apparatus

FIGS. 16 and 17 are block diagrams illustrating the interrelationship of apparatus on the controlled aircraft (FIG. 16) and apparatus at the remote flight control center (FIG. 17).

5.1 Apparatus on the Controlled Aircraft

Referring to FIG. 16, on board the controlled aircraft is equipment denominated generally as "local flight control" equipment 40 which includes all of the devices required to control and actuate the throttles, elevator, rudder, flaps, ailerons, landing gear and all the other components which must be controlled to safely fly the aircraft. The autopilot is controllable by the onboard aircraft pilot by LFC 40. All of the equipment, thus far, is conventional on an aircraft.

During an ordinary (e.g., non-hijacked) flight, the Master Aircraft Control (FIG. 1, discussed above) is in State 1, in which the onboard pilot controls the aircraft. The onboard pilot can issue three types of signals:

(a) 42A, signals which control the flight of the aircraft;

(b) 42B, signals which give control to, or take control away from the pilot; and (c) 42C signals which select from a variety of destinations pre-programmed into the autopilot 50.

During an in-flight emergency, the Remote Piloting Equipment 80 allows removal of control of the affected aircraft from the onboard pilot. The declaration of such an emergency originates with either:

(a) the pilot, or other designated on-board person(s) who cause an output from a PITO evaluation unit 46, or (b) a designated person or persons off-aircraft, who issue a RITO (Remote Initiated Takeover) command, which is received by aircraft receiver 60.

A PITO command (signals 48, FIG. 2) results in three events:

(a) Signal 48A causes the aircraft transmitter to notify the remote control center that PITO occurred;

(b) Signal 48B causes local flight control interrupt switch 52 to disconnect local flight control 40 i) from Master Aircraft Control 10 and ii) from autopilot 50. From that moment, this disconnection prevents any person on the controlled aircraft from controlling said aircraft;

(c) Signal 48C causes the Master Aircraft Control to switch to either MAC State 2 (remote pilot control) or state 3 (autopilot control).

In Method 1A, a PITO input results in a signal 48C, which causes Master Aircraft Control 10 to switch to MAC State 2, in which the aircraft is controlled by the remote pilot 50. In this case, the autopilot serves only a backup function. In this situation, aircraft control signals 62A, received by aircraft receiver 60, are routed by the Master Aircraft Control 10 to each of a) the controlled aerodynamic surfaces, 70, and b) other non-aerodynamic functions (e.g., cabin lighting and temperature). State setting signals 62B may be sent from off-aircraft. These signals allow the off-aircraft (remote) pilot to, if necessary, transfer control to the onboard autopilot 50 (e.g., in the event of attempted hacking). The possibility of a situation in which the off-aircraft pilot sends a state setting signal to revert to MAC State 1 (on-board pilot control) is discussed below.

In Method 1B, a PITO input results in signal 48C, which causes Master Aircraft Control 10 to switch to MAC State 3, in which the aircraft is controlled by the autopilot 50. Later, when an interceptor aircraft arrives, the interceptor sends a state setting signal 62B via receiver 60, which switches Master Aircraft Control 10 to MAC State 2 in which the aircraft is controlled by the remote pilot.

Signals 62C may be sent from the remote flight control equipment to control one or more video cameras 66 located inside or outside the controlled aircraft. Controlled parameters may include camera orientation, zoom, focusing, frame rate, filtering etc.

In a preferred embodiment of the invention, handshake signals 62D sequentially signal the aircraft receiver 60, the aircraft transmitter 64, the remote control receiver and the remote control receiver, allowing for the system at both ends to verify proper communication between the controlled aircraft and the remote flight control equipment.

Aircraft receiver signal 62E, which initiates RITO onboard the controlled aircraft, is described below.

Aircraft receiver signal 62F allows the remote pilot to select from a menu of possible routes and destinations which may be stored in the autopilot. In an alternate embodiment of the invention, the remote pilot is allowed to control individual autopilot parameters such as altitude and heading. However, this latter embodiment is more susceptible to hacking with adverse consequences, than the aforementioned menu-controlled embodiment.

Aircraft transmitter 64 has inputs from four sources:

(a) images from video cameras 66;

(b) flight data (such as altitude, attitude, heading, horizontal and vertical velocity, etc.) from aircraft sensors 68;

(c) PITO signal 48A; and (d) handshake signal 62D from the aircraft receiver 60.

Embodiments of the invention are possible which either a) allow, or b) do not allow RITO. The advantage of RITO is that it allows for the protection of an aircraft in flight without the invitation to do so by its crew. The disadvantage is that RITO capability makes the system easier to hack.

An off-aircraft RITO command is received by the receiver 60, which results in signal 62E causing local flight control interrupt switch 52 to disconnect local flight control 40 and thereby prevent aircraft control by any on-board person.

Four RITO formats are discussed below in the context of the aforementioned apparatus: Method 2A, Method 2B, Method 3A and Method 3B.

Method 2A has the least communication security because both the RITO command and the aircraft control signals which follow the RITO command are long range signals. The advantage of Method 2A among the RITO methods, is that it allows full control of the aircraft as soon as an emergency is detected.

Communication security in Method 2B stems from allowing a low energy, long range RITO signal to have only a momentary influence on the controlled aircraft. When received via receiver 60, the RITO signal generates state setting signal 62B which switches the Master Aircraft Control 10 to MAC State 3. Thereafter, Method 2B is identical to Method 1B: The autopilot 50 controls the aircraft until the arrival of an interceptor aircraft.

In Method 3A, communication security is obtained by allowing only highly selective receipt of aircraft control signals 62A and state setting signals 62B. This selectivity is achieved by restricting communication to short range and through the use of one or more of the following:

(a) high power remote control transmitter signals;

(b) low sensitivity setting of aircraft receiver 60; and (c) highly directional transmitting and receiving means. This situation obtains after the arrival—within the rLOS of the aircraft to be controlled—of an appropriately equipped interceptor aircraft.

Method 3B allows for the most secure technique of RITO, since (a) the state setting takeover signal 62B is short range, sent by an interceptor aircraft within the rLOS of the HAC, (b) actual aircraft control signals 62A may be restricted to the final approach to the landing field and the landing itself. Thus the extent to which the HAC is flown by the remote pilot is highly restricted with respect to both (a) distance (The low velocity of the HAC at landing allows the shortest communications distance with an IAC.) and (b) time (The remote pilot is in control only for the landing phase.).

Embodiments of the invention are possible in which the function of local flight control interrupt switch 52 is assumed by the Master Aircraft Control. In such a circumstance, the receipt of PITO signal 48C or RITO signal 62B by Master Aircraft Control 10 would lock out MAC State 1 on either an irreversible basis, or such that the lockout is reversible only in the event of simultaneous failures of both the autopilot and the remote pilot control, as discussed above. In the embodiment without interrupt switch 52, PITO signal 48B would instead go directly to the autopilot, to lock out any subsequent control of the autopilot by an on-board person. For the same reason, aircraft receiver output 62E would go directly to the autopilot.

Following landing of the controlled aircraft, a touchdown sensor signals the Master Aircraft Control which sets it to MAC State 4, in which control of the throttle(s) and or one or more of the aerodynamic aircraft surfaces prevents takeoff.

One or more microprocessors—each of which may be one of many types known in the art—is linked to the aircraft receiver, master aircraft control and autopilot, and performs:

(a) decryption, decoding and password identification functions;
(b) handshake management;
(c) master aircraft control state setting;
(d) local flight control interrupt switch state setting; and
(e) autopilot menu management;

using techniques which are known in the art.

5.2 Apparatus at the Remote Flight Control Center

Referring to FIG. 17, remote control receiver 90 receives signals sent from aircraft transmitter 64 (FIG. 16) which include:

(a) aircraft sensor information (altitude, GPS readings, aircraft orientation, airspeed, engine conditions, etc.;
(b) video information from cameras which show both exterior and interior views;
(c)-handshake signals; and
(d) a PITO signal, if any.

After decryption, decoding and formatting, the information carried by these signals is displayed at remote pilot display 91, and viewed by remote pilot 92. The remote pilot controls the hijacked aircraft using remote pilot controls 93A. The controls may include switches, a joystick, keyboard(s) and one or more touch sensitive screens, as are known in the art, each of which generate control signals. Control signals may also be generated using voice recognition apparatus. These control signals are encoded, encrypted and then transmitted by remote control transmitter 94.

The work station 95 for remote pilot, which includes remote pilot display 91 and remote pilot controls 93A, 93B and 93C may be set up to mimic the appearance of the onboard pilot's console; along similar lines, a group of screens may be set up which display video from the HAC video cameras in an array which mimics the pilot view from the HAC. Alternatively, either the display, the controls or both may be arrayed in an entirely different format. Such formatting would include but not be limited to:

(a) all video displayed on a single screen;
(b) all controls on a single touch sensitive screen;
(c) all video and all controls on a single screen;
(d) duplication of one or more controls and one or more screens so that two or more pilots may cooperatively control the HAC.

Handshake signals 96, used to let the remote pilot know that the communications link with the HAC is intact, are passed from remote control receiver 90 to remote control transmitter 94 and thence, sequentially, to aircraft receiver 60, to aircraft transmitter 64 and back to remote control receiver 90, in a continuously repeating manner. Interruption of the handshaking process, when sensed aboard an HAC in MAC State 2, would result in a switch to MAC State 3, autopilot control.

In the event of an aircraft takeover decision originating from the Remote Control Center, the remote pilot sends a RITO command from console component 93B, which may be a touch-sensitive screen, via transmitter 94 to the HAC.

One embodiment of the invention includes a destination menu for the autopilot; that is, the autopilot would be controlled by a limited menu of route and destination choices which are programmed onto write-once hardware and/or software. The advantage of such an approach would be that would-be hackers would not be able to redirect the RAC to anywhere but those safe routes and destinations listed in the menu. The destinations would be only secure airfields. The remote pilot may input his choice of route and destination from the menu, using input 93C. In an embodiment of the invention where different to-be-controlled aircraft have different route and destination menus, the menu contents would be received by receiver 90, and presented to the remote pilot on display 91.

The Remote Control Center Equipment shown in FIG. 17 may be located:

(a) at a terrestrial remote control center;
(b) at an airborne remote control center;
(c) aboard an interceptor aircraft; and/or
(d) at the control tower of the airfield at which the hijacked aircraft is to land.

6. Flow Diagrams: Methods with Intermediate Autopilot Control Figures

6.1 Methods 1B and 2B

FIG. 18 is a flowchart which shows the sequence of events which occur in Methods 1B and 2B. It shows how, after an initial phase, the two methods eventually result in the same approach to aircraft control. It also shows the relationship between events and the generation of the control signals for the Master Aircraft Control Unit of FIG. 1.

The left-most column of rectangular blocks refers to events in the remote control center (RCC). The middle column refers to events aboard an interceptor aircraft. The right-most column refers to events aboard the aircraft to be controlled.

6.1.1 Method 1B

In Method 1B, the initiating action is referred to as Button Press (BP), which occurs aboard an aircraft when an in-flight emergency is declared.

HAC (Hijacked aircraft) BP, block 100, results in three events:

(a) transmission of a PITO signal, block 102A, to a remote control center. (This corresponds, in FIG. 16, to signal 48A activating aircraft transmitter 64.) Receipt of the signal, block 104, results in the scrambling of an IAC, block 106, whose destination is the HAC;

(b) setting the Onboard Interrupt Switch to the open position, block 102B. (This corresponds, in FIG. 16, to signal 48B causing the opening of switch 52.) This locks out all onboard input from the Master Aircraft Control and from the autopilot; and (c) setting the MAC to State 3, block 102C, in which the autopilot controls the aircraft. (This corresponds, in FIG. 16, to signal 48C.) Circle 103A and its corresponding circle 103B of FIG. 1, indicate this state setting input to the Master Aircraft Control 10.

The interval of time during which the interceptor aircraft is en-route to the hijacked aircraft is indicated by blocks 108A (corresponding to the IAC) and 108B (corresponding to the HAC).

Upon arrival of the IAC within the rLOS of the HAC, block 110A, IAC identification, block 110B, by the HAC system occurs. Identification formats include but are not limited to:

(a) transmission of one or more passwords by the IAC. These passwords may be fixed, or changed from time to time. If changed, they may be changed once per flight, more frequently, or less frequently;

(b) encryption of IAC commands for HAC flight control in a unique way. The encryption/decryption keys [as well as the aforementioned password(s)] could be generated before or during the flight, and could originate (i) at the HAC, (ii) at the remote control center, or (iii) at another location;

(c) both (a) and (b); or (d) neither of the above.

One or more microprocessors—each of which may be one of many types known in the art—is linked to the aircraft receiver and performs decryption, decoding and password identification functions, using techniques which are known in the art.

Additional communication security means, as discussed above, may include one or more of:

(a) using highly directional transmission and reception means aboard the HAC and IAC (see FIG. 6);

(b) limiting HAC-IAC communication distances to short range;

(c) selecting communication frequency(ies) which do not propagate well over long distances; and (d) setting the HAC receiver at a low sensitivity, and compensating for it by using an adequately high HAC transmitter output.

In Method 1B, the IAC-based remote pilot's first command, following identification, is to set the MAC to State 2, remote pilot control, block 112. (This command corresponds, in FIG. 16, to signal 62B.) Circle 113A and its corresponding circle 113B of FIG. 1, indicate this state setting input to the Master Aircraft Control 10.

As indicated in the aforementioned, the remote pilot then uses equipment in his remote control center (FIG. 17) to receive flight data from the HAC and to transmit flight control signals, block 114A. Equipment onboard the HAC (FIG. 16) transmits flight data to the remote pilot and receives the remote pilot's flight control signals, block 114B. These control signals (62A in FIG. 16), routed through the Master Aircraft Control, control (a) elements related to flying the HAC (e.g., throttles, elevator, rudder, ailerons, etc.) and may control (b) items indirectly related to the flight (e.g., cabin and cockpit temperature, lighting etc.). In a preferred embodiment of the invention, these signals may also control information acquisition and communication systems [e.g., the orientation of video cameras both outside and inside of the aircraft, as well as the HAC transmitter(s) and receiver(s)].

During the remote pilot controlled portion of the flight, the autopilot may be used:

(a) automatically, if communication is interrupted between the HAC and the IAC; or (b) electively, for a portion of the flight that the remote pilot selects In this case he may either set the autopilot, or choose from a menu of autopilot choices (signal 62F, FIG. 16).

Upon reaching an appropriately secure airfield, the remote pilot lands the HAC, block 116A. This landing is preferably accomplished with the remote pilot able to observe the approach and landing directly, from whatever orientation he prefers. Touchdown sensing equipment signals the MAC, block 116B, which sets it to MAC State 4, in which takeoff can not occur. Circle 117A and its corresponding circle 117B of FIG. 1, indicate this state setting input to the Master Aircraft Control 10.

Once the hijacking or emergency is over, the system may be reset from a location off of the HAC, block 118A. The resetting sets the MAC to State 1, block 118B. Circle 119A and its corresponding circle 119B of FIG. 1, indicate this state setting input to the Master Aircraft Control 10. The conditions needed for reset may include any of:

(a) an encrypted signal which originates off-aircraft;

(b) replacement of equipment on the aircraft (which is not accessible in-flight), e.g., write-once-only types of memory which may be associated with the MAC; or (c) both (a) and (b).

More complex resetting requirements are likely to make the system more resistant to an inappropriate reset to MAC state 1.

6.1.2 Method 2B

In Method 2B, the initiating action, or Button Press (BP), occurs at a remote control center (RCC) to which information has been relayed which indicates that a particular aircraft:

(a) is being hijacked;

(b) is a potential hijacking target;

(c) has one or more pilots who are incapacitated; or (d) is following a course which is deemed to be inappropriate.

As above, in the discussion which follows, all such situations will be referred to as an aircraft hijacking, and the aircraft aboard which the event occurs will be referred to as the hijacked aircraft.

Control Center (CC) BP, block 120, results in two events:

(a) transmission of a RITO signal, block 122, to the HAC receiver. Receipt of the signal, block 124, is followed by an identification procedure which may involve passwords, confirmation of proper encryption, or other methodology, as discussed above in relation to IAC Identification. A properly transmitted RITO signal results in:

(i) setting the Onboard Interrupt Switch to the open position, block 102B, which locks out all onboard input from the Master Aircraft Control and from the autopilot (discussed above); and (ii) setting the MAC to State 3, block 102C, in which the autopilot controls the aircraft (discussed above).

(b) the scrambling of an IAC, block 106, whose destination is the HAC;

From this point in time, Method 2B is identical to Method 1B, as shown in FIG. 18.

6.2 Method 3B

A flowchart for Method 3B is illustrated in FIG. 19. As was the case with FIG. 18, the left-most column of rectangular blocks refers to events in the RCC; the middle column refers to events aboard an IAC; and the right-most column refers to events aboard the aircraft to be controlled.

Referring again to FIG. 19, Control Center (CC) BP, block 220, results in only one event, the dispatch of an IAC, block 206, whose destination is the HAC. (In Method 2B, the CC BP results in two events: IAC dispatch and transmission of a RITO signal.) In the Method 3B scenario, there is no external interaction with the HAC until after the sequence:

(a) IAC en-route to HAC, block 208;

(b) IAC arrives at the rLOS of HAC, block 210; and (c) IAC, upon arrival, transmits a short range RITO signal to the HAC, block 222.

Receipt of the RITO signal, block 224, is followed by a sequence of events similar to that of Method 2B: Advantageously, there is an identification procedure which may involve passwords, confirmation of proper encryption, or other methodology, as discussed above. Once properly confirmed, the RITO signal results in:

(a) setting the Onboard Interrupt Switch to the open position, block 202A, which locks out all onboard input from the Master Aircraft Control and from the autopilot (discussed above); and (b) setting the MAC to State 3, block 202B, in which the autopilot controls the aircraft. Circle 203A and its corresponding circle 103B of FIG. 1, indicate this state setting input to the Master Aircraft Control 10.

Method 3B differs from each of Methods 1B, 2B and 3A in that, on arrival, Method 3B calls for the IAC based remote pilot to initially set the MAC to State 3, autopilot control; Methods 1B, 2B and 3A call for the remote pilot to set the MAC to State 2 on arrival. Each of the six Methods 1A-3A and 1B to 3B calls for MAC to be in State 2—remote pilot control—when the HAC is landing.

Possible advantages of Method 3B include:

(a) During the period of autopilot control, there is less concern about communication interference due to both intentional efforts by unauthorized persons (i.e., hacking) and unintentional sources of interference; and (b) If the communication link between HAC and IAC is very short range and very highly directional, it may be harder to maintain at the higher air speeds, than is the case when air speed is decreased, as is the case during landing.

If the remote pilot chooses to send the RITO signal before he is within rLOS of the HAC, then this approach may be considered a variation of Method 2B; This is shown in FIG. 4B. This may occur as part of a scenario where the initial intention was Method 3B, but because of deteriorating conditions aboard the HAC, it becomes impossible to wait for IAC arrival at the HAC before switching to autopilot.

Blocks 226A and 226B indicate the possibility of allowing the remote pilot to reset the autopilot. He may be allowed to input one or more particular settings, or he may be allowed to choose from a menu of autopilot options.

At some point following the setting of MAC to State 3 and before landing, the remote pilot takes control of the HAC, block 212A, by transmitting a signal to set the MAC to State 2, block 212B. Circle 213A and its corresponding circle 113B of FIG. 1, indicate this state setting input to the Master Aircraft Control 10.

From this point in time, Method 3B is identical to both Methods 1B and 2B. Accordingly, the un-numbered blocks of FIG. 19 are identical to and have identical function to their counterparts in FIG. 18.

TABLE 6

ABBREVIATIONS

| | |
|---|---|
| ARCC | Airborne Remote Control Center |
| BP | Button Press |
| HAC | Hijacked Aircraft |
| IAC | Interceptor Aircraft |
| MAC | Master Aircraft Control |
| PITO | Pilot-Initiated Takeover |
| RCC | Remote Control Center |
| RITO | Remote-Initiated Takeover |
| rLOS | Range of Points Which are Substantially Within Line-of-Sight |
| TO | Takeover |
| TRCC | Terrestrial Remote Control Center |
| XFER | Transfer |

There has thus been shown and described a novel method and system for controlling a hijacked aircraft which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A method for controlling the flight of a first aircraft in the event of an in-flight emergency, employing a system which comprises:

(1) onboard manual flight control means for manual flight control of said first aircraft by an onboard human pilot;

(2) an onboard automatic flight control system, comprising at least one of an autopilot and a flight management computer system, for automatic flight control of said first aircraft;

(3) remote manual flight control means, in two-way communication with said first aircraft, for remote manual flight control by a remote human pilot located in a second aircraft, separate and apart from said first aircraft, and in visual contact with said first aircraft; and (4) onboard remote piloting means for allowing the control of said first aircraft by said remote human pilot with the aid of said remote flight control means;

said method comprising the steps of:

(a) detecting an in-flight emergency wherein the onboard pilot is incapable of manually flying said first aircraft due to an attack upon said first aircraft or its occupants, including its onboard human pilots, or due to any other incapacity of said onboard human pilots;

(b) upon detection of said in-flight emergency, automatically controlling the flight of said first aircraft by means of said onboard flight control system to cause said first aircraft to fly in accordance with a prescribed emergency flight plan; and (c) manually piloting said first aircraft by remote control, with the aid of said remote manual flight control means and said onboard remote piloting means, by said remote human pilot in said second aircraft, to activate aerodynamic control surfaces of said aircraft in substantially real time to control the flight of said aircraft without guidance of said autopilot, to land said first aircraft at an airfield while in visual contact with the first aircraft.

2. The method defined in claim 1, wherein said prescribed emergency flight plan includes the step of flying said first aircraft to the vicinity of a designated airfield for landing.

3. The method defined in claim 2, wherein said first aircraft is flown to the vicinity of said designated airfield at an altitude below 10,000 feet above sea level, terrain permitting, to minimize the effect of an accidental sudden decompression of the aircraft cabin.

4. The method defined in claim 2, wherein said first aircraft is flown to the vicinity of said designated airfield via a prescribed emergency flight path which avoids other aircraft and maximizes safety.

5. The method defined in claim 2, wherein said first aircraft is flown to the vicinity of said designated airfield along a flight path which avoids over-flying populated areas on the ground.

6. The method defined in claim 2, wherein said first aircraft is flown to the vicinity of said designated airfield along a flight path which avoids over-flying specific areas.

7. The method defined in claim 1, wherein said remote manual flight control means and said remote human pilot are located on the ground at a central station which is in two-way communication with said first aircraft.

8. The method defined in claim 7, wherein said central station is within sight of said first aircraft.

9. The method defined in claim 8, wherein said central station is located at the landing field selected for said first aircraft.

10. The method defined in claim 8, wherein said two-way communication is substantially directional between said first aircraft and said central station, to prevent unauthorized communication with said first aircraft.

11. The method defined in claim 7, wherein said first aircraft has means for reducing the receiver sensitivity to receipt of signals from said ground station, when the first aircraft and the ground station are in close proximity.

12. The method defined in claim 1, wherein said first aircraft has means for reducing the receiver sensitivity for receipt of signals from the second aircraft.

13. The method defined in claim 1, wherein said second aircraft is within sight of said first aircraft.

14. The method defined in claim 13, wherein said second aircraft follows said first aircraft in flight.

15. The method defined in claim 1, wherein antennas for said two-way communication between said first and said second aircraft are directional, to prevent unauthorized communication with said first aircraft.

16. The method defined in claim 1, wherein said remote human pilot manually controls a plurality of variable parameters of said first aircraft, with the aid of said remote manual flight control means, to remotely pilot said first aircraft after detection of said in-flight emergency, said parameters being selected from the group consisting of throttles, elevator, rudder, flaps, ailerons and landing gear.

17. The method defined in claim 1, wherein, upon detection of said in-flight emergency, the response to all onboard human operation of the first aircraft is inactivated, so that no onboard person is able to affect the ability of the first aircraft to automatically fly in accordance with said prescribed emergency flight plan.

18. The method defined in claim 17, wherein, after response to all onboard human operation of the aircraft has been inactivated, flying the aircraft to its original destination with the aid of said onboard autopilot.

19. The method defined in claim 17, wherein, after response to all onboard human operation of the aircraft has been inactivated, flying the aircraft to a designated airfield with the aid of said onboard autopilot.

20. The method defined in claim 17, wherein, after response to all human operation of the onboard autopilot has been inactivated, automatically selecting a preferred airfield, from a plurality of pre-designated airfields, depending upon the current location of the first aircraft, and then flying the aircraft to said selected airfield with the aid of said onboard autopilot.

21. The method defined in claim 1, wherein step (b) comprises the step of remotely modifying said prescribed emergency flight plan of said first aircraft and thereafter automatically flying said first aircraft, with the aid of said flight control system, in accordance with the modified prescribed emergency flight plan.

22. The method defined in claim 21, wherein, the prescribed emergency flight plan of said autopilot is modified by said remote human pilot with the aid of said remote manual flight control means.

23. The method defined in claim 21, wherein said prescribed emergency flight plan includes the step of flying said first aircraft to the vicinity of a designated airfield for landing.

24. The method defined in claim 23, wherein said designated airfield is selected by a remote human pilot.

25. The method defined in claim 24, wherein said designated airfield is selected from among a plurality of pre-designated airfields.

26. The method defined in claim 21, wherein said first aircraft is flown to the vicinity of said designated airfield at an altitude below 10,000 feet above sea level, terrain permitting, to minimize the effect of an accidental sudden decompression of the aircraft cabin.

27. The method defined in claim 21, wherein said first aircraft is flown to the vicinity of said designated airfield via a prescribed emergency flight path which avoids other aircraft.

28. The method defined in claim 21, wherein said first aircraft is flown to the vicinity of said designated airfield along a flight path which avoids over-flying certain areas on the ground.

29. The method defined in claim 21, wherein said first aircraft is flown to the vicinity of said designated airfield along a flight path which avoids over-flying specific areas.

30. The method defined in claim 21, wherein said remote manual flight control means and said remote human pilot are located on the ground at a central station which is in two-way communication with said first aircraft.

31. The method defined in claim 30, wherein said central station is within sight of said first aircraft.

32. The method defined in claim 31, wherein said central station is located at the landing field selected for said first aircraft.

33. The method defined in claim 31, wherein said two-way communication is highly directional between said first aircraft and said control station, to prevent unauthorized communication with said first aircraft.

34. The method defined in claim 30, wherein said first aircraft has means for reducing the sensitivity of receipt of signals from said ground station, when the first aircraft and the ground station are in close proximity.

35. The method defined in claim 1, wherein the step of detecting an in-flight emergency includes the step of determining when an authorized crew member of said first aircraft fails to perform a specified activity within a prescribed period of time.

36. The method defined in claim 35, wherein the specified activity is to press a button.

37. The method defined in claim 35, wherein the specified activity is to speak a specified word.

38. The method defined in claim 35, wherein the specified activity is to enter a specified code in a keypad.

39. The method defined in claim 35, further comprising the step of alerting an authorized crew member of the first aircraft to the termination of the prescribed period of time, shortly before the prescribed period of time has elapsed.

40. The method defined in claim 39, wherein said alerting step is performed by issuing at least one of an audible sound and a visual signal.

41. The method defined in claim 1, wherein said first aircraft further comprises:
   a master aircraft control on said first aircraft being operative to receive (a) a set of aircraft control inputs from each of (1) said onboard manual flight control means, (2) said onboard remote piloting means, and (3) said onboard autopilot, said master aircraft control being further operative to output control signals to an output to control the aerodynamic surfaces of said first aircraft when said control unit is in a first, a second and a third operating state, respectively, and (b) at least one control input for setting the state of the master aircraft control.

42. The method of claim 41, wherein said control input sets the state of said master aircraft control to the third state when said in-flight emergency is detected on board the first aircraft.

43. The method of claim 42, wherein said control input sets the state of the master control to the second state upon transmission of a remote takeover signal from a location remote from said first aircraft.

44. The method of claim 43, wherein, following the enabling of master control state 2 from a location remote from said first aircraft, said aircraft control inputs come from a remote pilot located at a ground-based central station.

45. The method of claim 44, wherein, upon arrival of said second aircraft to a range of points which are substantially within the line of sight of said first aircraft, control of said first aircraft is transferred from said remote pilot located at said ground based central station to said remote pilot located upon said second aircraft.

46. The method of claim 42, wherein said control input sets the state of the master aircraft control to the second state following the receipt of a second set of master aircraft control state-setting inputs from a second aircraft.

47. The method of claim 46, wherein said second aircraft is substantially within line of sight of said first aircraft.

48. The method of claim 47, wherein said first aircraft receiver has means for reducing receiver sensitivity.

49. The method of claim 42, wherein said control input sets the state of the master aircraft control to the second state following the receipt of said second set of master aircraft control state-setting inputs from a ground-based central station.

50. The method of claim 42, wherein said control input sets the state of the master aircraft control to the second state and maintaining said third state until the arrival of said second aircraft.

51. The method of claim 50, wherein said master aircraft control cannot return to said first state after reaching the second and third states, without intervention by authorized personnel.

52. The method of claim 42, wherein said control input sets the state of the master aircraft control to the second state when said first aircraft reaches the vicinity of said control tower at said designated airfield.

53. The method of claim 52, wherein said master aircraft control cannot return to said first state after reaching the second and third states, without intervention by authorized personnel.

54. The method of claim 43, wherein, following the enabling of master control state 2 from off said first aircraft, said aircraft control inputs come from said ground-based central station.

55. The method of claim 43, wherein, following the enabling of said second state from a location remote from said first aircraft, said control inputs come from said remote pilot aboard said second aircraft.

56. The method of claim 41, wherein,
(1) upon detection of said in-flight emergency, said ground-based central station: (a) causes said second aircraft containing remote pilot and piloting means to fly to the vicinity of said first aircraft, and (b) transmits said master control state setting signal to said first aircraft which causes said master aircraft control to initially enter master aircraft control state 3; and
(2) upon arrival of said second aircraft to a range of points which are substantially within the line of sight of said first aircraft, said second aircraft transmits said master control state setting signal to said first aircraft which causes said to enter master aircraft control state 2, whereby said remote pilot controls the flight of said first aircraft.

57. The method of claim 41, wherein said master aircraft control switches from state 2 to state 3 whenever said aircraft control inputs are not received from said onboard piloting means.

58. The method of claim 57, wherein said master aircraft control switches from state 3 back to state 2 when said aircraft control inputs are received.

59. The method of claim 41, wherein said master aircraft control has a fourth operating state in which none of said sets of aircraft control inputs is output to control the aerodynamic surfaces of said first aircraft, wherein said control unit is placed in said fourth operating state when said first aircraft is on the ground.

60. The method defined in claim 59, wherein the state of said control unit is changed to said fourth operating state when said first aircraft has been manually flown by said remote human pilot and landed at said airfield.

61. The method defined in claim 60, wherein the state of said control unit is changed from said fourth to said first operating state when said control unit is supplied with a security code with the aid of said remote manual flight control means and said onboard remote piloting means.

62. The method defined in claim 1, further comprising the step of:
upon detection of said in-flight emergency, inactivating the response to onboard human operation of the onboard manual flight control means so that no onboard person is able to manually fly said first aircraft.

63. The method defined in claim 1, further comprising the step of:
upon detection of said in-flight emergency, inactivating the response to onboard human operation of the onboard autopilot so that no onboard person is able to affect the ability of the autopilot to automatically fly said first aircraft.

64. The method defined in claim 1, further comprising the step of manually changing the prescribed emergency flight plan in said autopilot, with the aid of said remote flight control means, by said remote human pilot.

65. The method defined in claim 64, wherein said step of manually changing the prescribed emergency flight plan in said autopilot includes changing individual autopilot parameters.

66. The method defined in claim 65, wherein said autopilot parameters include altitude and heading.

67. Apparatus for controlling the flight of a first aircraft in the event of an in-flight emergency, said apparatus comprising, in combination:
(a) remote flight control means, located in a second aircraft, separate and apart from said first aircraft, for remote flight control of said first aircraft by a remote human pilot who is in visual contact with said first aircraft;
(b) onboard manual flight control means on said first aircraft for manual flight control of said first aircraft by an onboard human pilot;
(c) an onboard automatic flight control means, comprising at least one of an autopilot and a flight management computer system, on said first aircraft for automatic flight control of said first aircraft;
(d) means for detecting an in-flight emergency on board the first aircraft, wherein the onboard pilot is incapable of manually flying said first aircraft due to an attack upon said first aircraft or its occupants, including its onboard human pilots, or due to any other incapacity of said onboard human pilots, and producing an in-flight emergency signal in response thereto; and (e) onboard remote piloting means on said first aircraft for receiving said in-flight emergency control signal and for receiving control signals from said remote flight control means and, in response thereto, activating aerodynamic control surfaces of said aircraft in substantially real time to control the flight of said aircraft without guidance of said autopilot, thereby to enable the control of said first aircraft by said remote human pilot, who is in visual contact with the first aircraft, in the event of said in-flight emergency.

68. The apparatus defined in claim 67, wherein said onboard remote piloting means (e) comprises a master aircraft control on said first aircraft, coupled to said means (a)-(d), which is operative to receive a set of aircraft control inputs from each of (b) said onboard manual flight control means, (a) said remote flight control means, and (c) said onboard autopilot, and to select a set of control inputs to control throttles and aerodynamic surfaces of said first aircraft, in response to said in-flight emergency control signal.

69. The apparatus defined in claim 68, wherein said master aircraft control has a plurality of operating states, wherein the control inputs from said onboard manual flight control means are selected when in a first state, the control inputs from said remote flight control means are selected when in a second state and the control inputs from said onboard autopilot means are selected when in a third state.

70. The apparatus defined in claim 69, wherein said master aircraft control has a fourth operating state, wherein none of said control inputs is selected when in said fourth state, said master aircraft control being set in said fourth state after said aircraft has landed following the detection of an in-flight emergency.

71. The apparatus defined in claim 67, wherein said means for detecting an in-flight emergency includes:
(1) an input device for receiving a live feed of at least one of audio and video from the flight deck and cabin of the first aircraft; and
(2) means connected to said input device for evaluating the live feed and determining therefrom if an in-flight emergency exists, and for producing said in-flight emergency signal if the content of the live feed exceeds a threshold indicating an in-flight emergency.

72. The apparatus defined in claim 71, wherein said means for detecting an in-flight emergency further comprises means for transmitting said in-flight emergency signal to a remote station.

73. The apparatus defined in claim 72, wherein said means for evaluating the live feed further produces a warning signal if the content of the live feed comes close to said threshold indicating an in-flight emergency, but does not exceed it.

74. The apparatus defined in claim 73, wherein said means for transmitting said in-flight emergency signal further comprises means for transmitting said warning signal to said remote station.

75. The apparatus defined in claim 72, wherein said means for transmitting said in-flight emergency signal further comprises means for transmitting said live feed to said remote station.

76. The apparatus defined in claim 67, further comprising a first transmitting and receiving device (T/R device) on board said first aircraft providing communication between said first aircraft and a remote station.

77. The apparatus defined in claim 76, wherein said first T/R device includes a directional first antenna for communication with a second antenna of a second transmitting and receiving (T/R) device that is coupled to said remote station.

78. The apparatus defined in claim 77, wherein said directional first antenna is oriented so as not to communicate with any ground-based antenna.

79. The apparatus defined in claim 77, wherein said second antenna includes a plurality of second antennas disposed at different locations, and wherein said second T/R device further comprises means for selecting the one of said second antennas that is used for transmitting to, and receiving from said first antenna.

80. The apparatus defined in claim 77, wherein said first and second T/R devices communicate at an RF frequency which propagates in the atmosphere only in a substantially a direct line of sight.

81. The apparatus defined in claim 77, wherein said second antenna is highly directional and is arranged adjacent an airfield on which said first aircraft is to land, after an in-flight emergency has been declared, said second antenna having means for aiming said second antenna at said first aircraft during landing.

82. The apparatus defined in claim 77, wherein said second antenna is directional and is arranged on said second aircraft.

83. The apparatus defined in claim 82, wherein said second antenna includes means for aiming said second antenna at said first aircraft.

84. The apparatus defined in claim 77, wherein said first antenna includes means for pointing said first antenna at said second antenna.

85. The apparatus defined in claim 67, wherein said remote piloting means includes means for preventing flight control by any person on board said first aircraft, in response to receipt of said in-flight emergency control signal.

* * * * *